US011445128B2

(12) United States Patent
Swierk et al.

(10) Patent No.: US 11,445,128 B2
(45) Date of Patent: Sep. 13, 2022

(54) SYSTEM AND METHOD FOR INTELLIGENT VIRTUAL BACKGROUND MANAGEMENT FOR VIDEOCONFERENCING APPLICATIONS

(71) Applicant: Dell Products, LP, Round Rock, TX (US)

(72) Inventors: Todd E. Swierk, Austin, TX (US); Vivek Viswanathan Iyer, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 48 days.

(21) Appl. No.: 17/156,606

(22) Filed: Jan. 24, 2021

(65) Prior Publication Data

US 2022/0239847 A1 Jul. 28, 2022

(51) Int. Cl.
*H04N 5/272* (2006.01)
*H04N 7/15* (2006.01)
(Continued)

(52) U.S. Cl.
CPC ............ *H04N 5/272* (2013.01); *G01S 19/01* (2013.01); *G06N 3/08* (2013.01); *G06T 1/20* (2013.01);
(Continued)

(58) Field of Classification Search
CPC .......... H04N 5/272; H04N 7/15; G01S 19/01; G06N 3/08; G06T 1/20; G06T 7/13; G06T 2207/20084; G06T 2207/30196
See application file for complete search history.

(56) References Cited

U.S. PATENT DOCUMENTS 6,535,238 B1 * 3/2003 Kressin ................. H04N 7/141
  348/E7.078
8,171,151 B2   5/2012 Dunbar
(Continued)

OTHER PUBLICATIONS

H. Purwins, et al., "Deep Learning for Audio Signal Processing," IEEE Journal of Selected Topics of Signal Processing, vol. 13, No. 2, May 2019, pp. 206-219.

*Primary Examiner* — Jennifer Mehmood
*Assistant Examiner* — Donna J. Ricks
(74) *Attorney, Agent, or Firm* — Prol Intellectual Property Law, PLLC; H. Kenneth Prol

(57) ABSTRACT

An intelligent video processing management method may comprise joining a videoconference session with multiple participants via a multimedia multi-user collaboration application, detecting a current central processing unit (CPU) consumption by the multimedia multi-user collaboration application and a current MMCA processor setting, associating each of the participants with an organizational ranking relative to the purpose of the videoconference session, inputting sensor data including the participant's organizational rankings, the current CPU consumption by the multimedia multi-user collaboration application, and the current MMCA processor setting to a trained neural network, outputting from the neural network an optimized boundary detection algorithm selection instruction predicted to adjust performance of the information handling system to meet a preset performance benchmark requirement, during the videoconference session, and applying a virtual background around a boundary of a user of the information handling system detected within an image captured by a camera according to the optimized boundary detection algorithm selection instruction.

20 Claims, 9 Drawing Sheets

(51) Int. Cl.
*G06T 1/20* (2006.01)
*G06N 3/08* (2006.01)
*G01S 19/01* (2010.01)
*G06T 7/13* (2017.01)

(52) U.S. Cl.
CPC ................ *G06T 7/13* (2017.01); *H04N 7/15* (2013.01); *G06T 2207/20084* (2013.01); *G06T 2207/30196* (2013.01)

(56) References Cited

U.S. PATENT DOCUMENTS

| | | |
|---|---|---|
| 8,711,255 B2 | 4/2014 | Yamashita |
| 8,780,166 B2 * | 7/2014 | Shanmukhadas ...... H04N 7/147 709/204 |
| 9,082,391 B2 | 7/2015 | Yermeche |
| 9,503,685 B2 * | 11/2016 | Baron, Jr. .............. H04N 7/157 |
| 2004/0267778 A1 | 12/2004 | Rudolph |
| 2004/0268369 A1 | 12/2004 | Debique |
| 2006/0094001 A1 | 5/2006 | Torre |
| 2009/0323818 A1 | 12/2009 | Weiss |
| 2011/0074910 A1 | 3/2011 | King |
| 2011/0283203 A1 | 11/2011 | Periyannan |
| 2015/0103136 A1 * | 4/2015 | Anderson ............... H04L 12/18 348/14.09 |
| 2020/0234205 A1 * | 7/2020 | Apps ....................... G06N 20/00 |
| 2021/0224319 A1 * | 7/2021 | Ingel ....................... G10L 17/26 |
| 2022/0021680 A1 * | 1/2022 | Roedel ................ H04L 12/1822 |
| 2022/0070389 A1 * | 3/2022 | Tangeland ........... H04N 5/2353 |

* cited by examiner

SYSTEM AND METHOD FOR INTELLIGENT VIRTUAL BACKGROUND MANAGEMENT FOR VIDEOCONFERENCING APPLICATIONS

FIELD OF THE DISCLOSURE

The present disclosure generally relates to multimedia, multi-user collaboration applications, such as videoconferencing applications. More specifically, the present disclosure relates to intelligently managing media processing pursuant to execution of such applications, based on performance metrics for an information handling system, and context factors related to organizational rankings of participants with respect to the purpose of a videoconference session.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
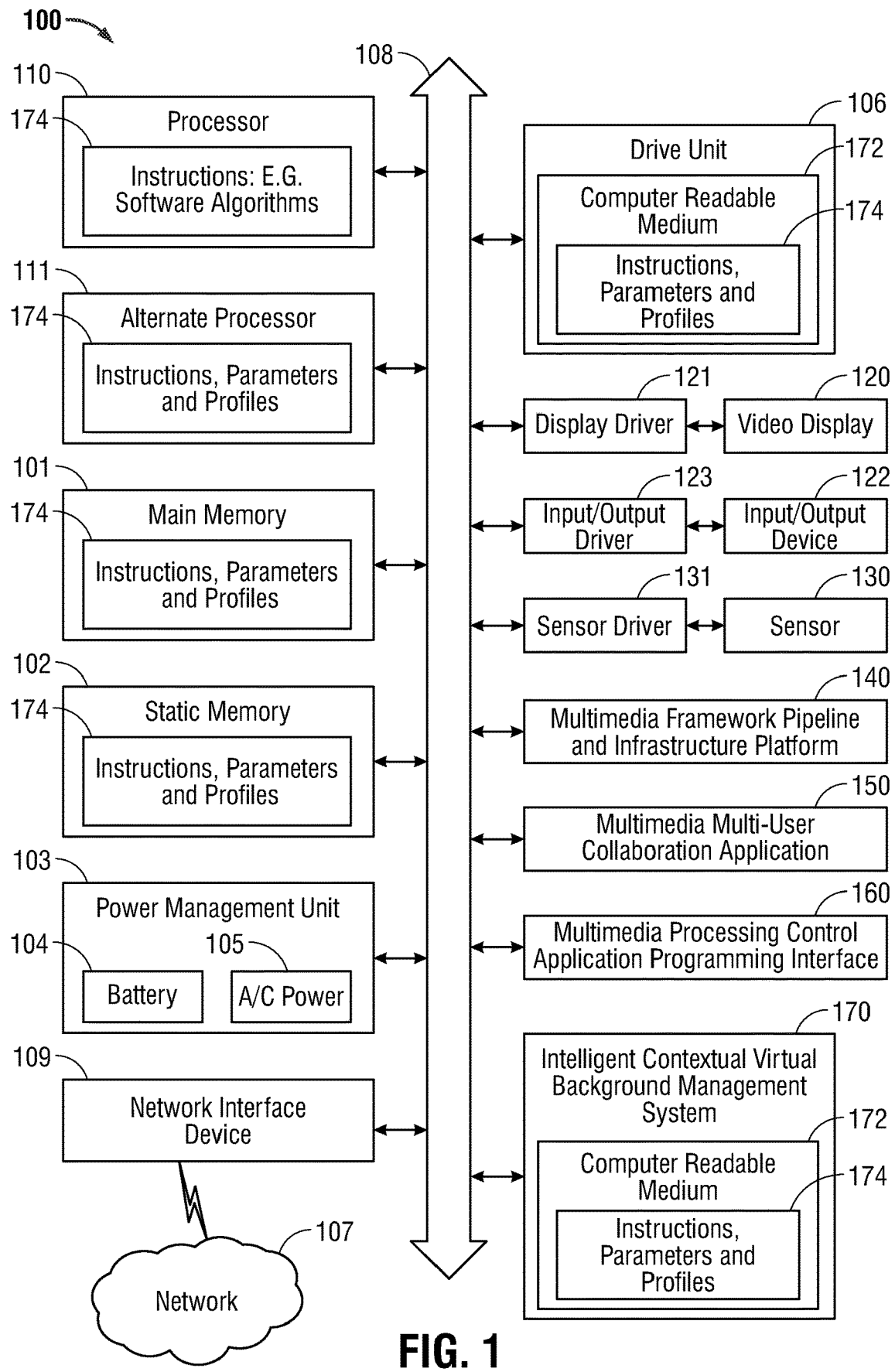
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

As working remotely has gained in popularity, so too has the prevalence of multi-employee or multi-business video conferences. Many of these video conferences (also referred to as web-conferences, online meetings, tele-video conferences, or remote conferences) may include a large number of people, sometimes exceeding 50 or 100 participants. In many cases, all of the participants of a videoconference are employees working within the same organizational rank (e.g., engineers), or working group, for example. In other cases, one of the participants of a videoconference may have a higher organizational rank or level of importance than other participants, relative to the user of the videoconference software and indicating a purpose or importance level of the videoconference. For example, a videoconference established for the purpose of selling a product may include a relatively lower organizational ranking salesperson, and a relatively higher organizational ranking assigned to a potential purchaser, customer, or client. As another example, a videoconference established for the purpose of approving a budget for a new project may include a relatively lower organizational ranking project manager and a relatively higher organizational ranking executive (e.g., Vice President or Chief Operational Officer). Based upon this, a user of a videoconferencing software system may prefer to present a best or most professional image for certain videoconference calls while for others, the most professional image presented may be of less importance than, say, preserving processor availability for simultaneous tasks or the like. Use of a type of virtual backgrounds and most complex boundary detection algorithms to create the most polished media sample of a user may only be necessary in a situation in which other participants of the videoconference have such a higher organizational ranking importance relative to the user when the purpose of the videoconference call involves a more professional context rather than a casual context. However, most existing multimedia multi-user collaboration applications (MMCAs) hosting such video conferences perform the highest quality video processing methods on videos of each participant, regardless of the organizational ranking of various participants in a videoconference session.

Existing MMCAs allow for manual selection of a virtual background to be turned on or off and even for manual selection of various types of virtual background features available to use with the system. Further, these existing MMCAs prioritize displayed video quality over most, if not all other functionality of any participant's computing devices. As a consequence, these existing MMCAs may simply display no virtual background as a default or display the most recently-selected virtual background for all videoconference calls. Further, the existing MMCAs routinely capture the richest audio and video, and perform media processing methods designed to provide the most polished video, upon display. However, this also absorbs an inordinate portion of the processing capacity for the computing device capturing the video, and the computing device that receives and plays the video. Thus, as the number of users within a single user session of these existing MMCAs increases, so too does the strain on the processors (e.g., of all participants) performing these video processing methods. This high demand on processing capacity may inhibit, or prohibit execution of other applications at any given participant's computing device or otherwise cause degradation in the information handling system performance. It may also cause the fan at any given participant's computing device to run loudly enough to interfere with the user's ability to hear and participate in the session, or interfere with audio capture of the user speaking during the session. A method is needed for tailoring the selection of virtual background based upon a determined purpose or importance of the videoconference call and invited participants as well as selection of types of post processing of a streaming video image or virtual background used during a videoconference session. For example, a type of boundary detection algorithm during a videoconference user session may be used to optimize performance of both the MMCA and other concurrently executed applications, based on performance metrics at each computing device and on organizational rankings of each of the participants relative to the user and the purpose for the videoconference user session.

The intelligent contextual virtual background management system in embodiments of the present disclosure addresses these issues relating to virtual background usage by training a machine-learning neural network to model a relationship between virtual backgrounds applied during training sessions, ambient lighting, geographic locations, and labeled organizational rankings of participants relative to the user, or indicating a purpose of the videoconference. For example, the neural network may be trained to identify a specific virtual background routinely used during such training sessions in which the user is presenting (e.g., indicating a professional atmosphere), sessions in which a participant has been labeled (e.g., by the user or by reference to organizational charts or titles identified in e-mail, enterprise profiles, or social media) as important with respect to the user, sessions in which the user has labeled the participant with a familial, friendly, or casual designation (e.g., friend from outside work, brother, mother, in-laws, etc.), sessions in which the user is in low ambient lighting, or sessions in geographic locations specifically labeled as private. Following such training, the organizational rank, participant labels, current geographic location, current lighting conditions, or meeting metrics indicating the user is sharing her screen or hosting the videoconference may be input into the trained neural network. In embodiments described herein, the trained neural network may infer a purpose for the videoconference, based on these inputs, and output optimized virtual background selection instructions to automatically apply the virtual background most often applied by the user for similar purposes during training sessions for the neural network. In another aspect, if the current geographic location of the information handling system has been labeled by the user as private, and the user always applies a virtual background to mask the background image of the master bedroom, the neural network may learn a strong correlation between geographic locations labeled as private and the need to apply a virtual background. As another example, if a user consistently selects virtual backgrounds having an average brightness that differs from the average ambient brightness of the user in a captured image in order to provide a good contrast between the user and the applied virtual background, the neural network may learn to enable a virtual background in such lighting conditions and to select virtual backgrounds that will provide greater contrast.

The neural network may also be trained in embodiments to model the relationship between boundary detection algorithms applied and MMCA processor settings (e.g., identifying one of a plurality of available processors for application of the virtual background or boundary detection) applied during the training sessions for the neural network. Following such training, which may coincide with the training described directly above with respect to the virtual background selection, the processor performance metrics, and current MMCA processor settings may be input into the trained neural network. In embodiments described herein, the trained neural network may output optimized MMCA processor instructions predicted to adjust performance of the information handling system to meet a preset performance benchmark, such as a capped percentage of resources at one of the plurality of processors that may be consumed by the MMCA during the videoconference user session. The optimized MMCA processor instructions may include, in various embodiments, an optimized boundary detection algorithm selection instruction, or an optimized offload instruction identifying a second processor to which some of the MMCA code instructions may be offloaded. For example, an optimized boundary detection algorithm selection instruction may identify a more complex boundary detection algorithm for detecting the edges of the user more accurately, if execution of that boundary detection algorithm will still meet the preset performance benchmark. As another example, an optimized boundary detection algorithm selection instruction may identify a less complex boundary detection algorithm, if execution of the more complex boundary detection algorithm is not predicted to meet the preset performance benchmark. The trained neural network may also adjust the optimized virtual background selection instruction based on the processor performance metrics, and current MMCA processor settings. For example, the optimized virtual background selection instruction may identify the virtual background most often applied by the user for similar purposes during training sessions for the neural network, and instruct the MMCA to apply this optimized virtual background at a lower resolution than would be applied by default.

The trained neural network (or neural networks) of the intelligent contextual virtual background management system may be executed on (or at a remote location for) a user's information handling system, where each user session may involve different purposes (e.g., sales pitch, project budget request, virtual happy hour with friends, meeting with family members) with various combinations of participants having different organizational rankings (e.g., engineer, sales associate, vice president, chief operating officer, non-professional friend, or family member). In embodiments described herein, the term "media" may refer to images or video samples (e.g., compilation of several images over time) captured by a camera, audio samples captured by a microphone, or a combination of audio and video samples to form a media sample providing both audio and video. A boundary detection module may execute a boundary detection algorithm to detect the edges of a user within such a captured image or video, and a virtual background module may operate to apply a virtual background around these detected edges. The virtual background module and the boundary detection module in embodiments may be a few of several A/V processing instruction modules, which may comprise code instructions or algorithms executed by a processor of the information handling system to transform a media sample data such as a video sample or audio sample through some form of A/V data processing technique.

Optimized MICA processor usage instructions determined by such neural networks in embodiments may operate to decrease the processing burden placed on the CPU at a participant's information handling system. Such a decrease in CPU resource load may be achieved in some embodiments in which all of the participants have similar or equivalent organization rankings, indicating the videoconference may be more casual, by the neural network identifying a lower quality or less complex virtual background or boundary detection algorithm in the optimized instructions output thereby. In other embodiments in which one of the participants has a relatively higher organizational ranking than the user of the information handling system, indicating a more polished and professional environment, the decrease in CPU resource load may be achieved by offloading execution of code instructions for applying a more polished or higher quality virtual background and boundary detection algorithm to an alternate processor (e.g., graphics processing unit (GPU), vision processing unit (VPU), or gaussian neural accelerator (GNA)).

The intelligent contextual virtual background management system, or portions thereof, may operate remotely from the information handling system for which the neural network is trained in some embodiments. For example, the intelligent contextual virtual background management system may operate as part of an information handling system performance optimizer application hosted, for example, by the manufacturer of the information handling system, or managed by the information handling system user's employer or Information Technology (IT) manager. Such an information handling system performance optimizer application may operate in example embodiments in various contexts to monitor certain performance metrics at the information handling system, perform firmware and software updates, confirm security credentials and compliance, and manage user access across a plurality of information handling systems (e.g., as owned by an employer or enterprise corporation). In such embodiments, the intelligent contextual virtual background management system may receive such performance metrics and metrics describing previous MMCA user sessions for an information handling system via any type of network, including out-of-band communications, and communications with one or more software applications, application programming interfaces (APIs), or directly with one or more controllers or firmware in kernel mode. In some embodiments described herein, the neural network trained for the transmitting information handling system may do so remotely from the transmitting information handling system engaging in such user sessions. In other embodiments described herein, the neural network may be transmitted to an agent of the intelligent contextual virtual background management system operating at the information handling system through which a user for the MICA may join a user session in progress.

The intelligent contextual virtual background management may transmit the optimized virtual background selection instruction or optimized MMCA processor utilization instructions to the multimedia framework pipeline and infrastructure platform controlling or directing execution of the virtual background module and boundary detection module. By offloading these executions to a non-CPU processor, the undesirable side effects (e.g., video lag, glitches, slowing of peripheral applications, engaging the fan to cool the CPU) associated with over-taxing the transmitting information handling system CPU during such executions (e.g., application of the virtual background or detection of the user boundaries within a captured image) may be avoided.

The multimedia framework pipeline and infrastructure platform in embodiments may execute each of the A/V processing instruction modules, including the virtual background module and boundary detection module on audio samples or video samples captured at the information handling system in order to create processed, encoded media samples that combine both video and audio samples into a single file. Media samples may be referred to herein as "processed" when the video sample or audio sample upon which the media sample is created has undergone at least one A/V processing instruction, which may include an encoding process, or other audio/video processing methods (e.g., zooming, virtual background application, cropping, user framing, resolution adjustment, normalization, boundary detection, background noise reduction, etc.).

The processing of media samples, the multimedia framework pipeline and infrastructure platform may transmit the processed, encoded media sample that includes video of the information handling system user to the MMCA for the information handling system. The processed, encoded media sample may then be transmitted to other information handling systems (e.g., receiving information handling systems) in use by other participants within the current user session for the MMCA, via a MMCA host server. These receiving information handling systems may then reprocess and decode the received media sample, for playback at the displays for these receiving information handling systems. In such a way, the intelligent contextual virtual background management system may decrease the processing burden at the information handling system capturing, processing, and transmitting media samples recording the user of the information handling system during participation in a current user session for a MMCA.

Turning now to the figures, FIG. 1 illustrates an information handling system 100 similar to information handling systems according to several aspects of the present disclosure. As described herein, the intelligent contextual virtual background management system 170 in an embodiment may operate to decrease the processing burden associated with the processing, encoding, and transmission of a media sample (e.g., including audio or video) from a transmitting information handling system to a receiving information handling system. The information handling system 100 in an embodiment described with reference to FIG. 1 may represent an information handling system capturing, processing, and transmitting a media sample capturing an image of a participant in a videoconference user session. In another embodiment, the information handling system 100 may operate remotely from the information handling systems executing code instructions of the multimedia multi-user collaboration application (MMCA) 150 to participate within a user session. For example, the intelligent contextual virtual background management system 170 may operate on a server, blade, rack, or cloud-based network maintained and controlled by the manufacturer of several information handling systems, or managed by an employer or enterprise owner of several information handling systems. In such an embodiment, the information handling system 100 may operate within one of these servers, blades, racks, or across various nodes of a cloud-based network to monitor certain performance metrics at each of the plurality of such information handling systems, perform firmware and software updates, confirm security credentials and compliance, and manage user access across the plurality of information handling systems (e.g., as owned by an employer or enterprise corporation). In such an embodiment, each of the plurality of information handling systems participating within a user session of the MMCA 150 may incorporate an agent or API for the intelligent contextual virtual background management system 170.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a control system, a camera, a scanner, a printer, a pager, a personal trusted device, a web appliance, or any other suitable machine capable of executing a set of instructions (sequential or otherwise) that specify actions to be taken by that machine, and may vary in size, shape, performance, price, and functionality.

The information handling system may include memory (volatile (e.g., random-access memory, etc.), nonvolatile (read-only memory, flash memory etc.) or any combination thereof), one or more processing resources, such as a central processing unit (CPU), a graphics processing unit (GPU), a vision processing unit (VPU), a Gaussian neural accelerator (GNA), hardware or software control logic, or any combination thereof. Additional components of the information handling system 100 may include one or more storage devices, one or more communications ports for communicating with external devices, as well as various input and output (I/O) devices 122, such as a keyboard, a mouse, a headset device incorporating one or more microphones and one or more speakers, a touchpad, or any combination thereof. The information handling system 100 may also include various sensors 130 (e.g., Hall effect positional sensors, hinge rotation sensors, geographic locations sensors such as GPS systems, light sensors, time of flight sensors, infrared sensors, etc.). A power management unit 103 supplying power to the information handling system 100, via a battery 104 or an alternating current (A/C) power adapter 105 may also be included within information handling system 100, as well as one or more buses operable to transmit communications between the various hardware components. The information handling system 100 may further include a video display 120. The video display 120 in an embodiment may function as a liquid crystal display (LCD), an organic light emitting diode (OLED), a flat panel display, or a solid-state display. Portions of an information handling system 100 may themselves be considered information handling systems 100.

In an example embodiment, the information handling system 100 may include a laptop or desktop system that executes the MMCA 150 that may operate as a videoconferencing application. The MMCA 150 may include any computer code that is executed by a processor 110, or other processors of the information handling system 100 in order to decrease the processing load generated during processing, and encoding of media samples for transmission, pursuant to execution of the MMCA 150. The multimedia framework pipeline and infrastructure platform 140 in an embodiment may execute code instructions to direct execution of specific processing and encoding of media samples for transmission.

The MMCA 150 in an embodiment may transmit to the multimedia framework pipeline and infrastructure platform 140 default settings for such processing, and encoding (e.g., via bus 108). Such default settings may not be optimized, and may result in unnecessarily high consumption of resources at the processor 102 of the information handling system 100. The intelligent contextual virtual background management system 170 in an embodiment may operate to determine optimized virtual background selection instructions, or optimized boundary detection algorithm selection instructions at the information handling system (e.g., 100) for execution of a virtual background module or boundary detection module, or optimized offload instructions identifying a type of alternate processor 111 (e.g., GPU, VPU, GNA) used to perform such executions, for example.

The intelligent contextual virtual background management system 170 in an embodiment may include code instructions 174 for training a neural network, or for executing a neural network. In an embodiment in which the intelligent contextual virtual background management system 170 operates to train a neural network, the information handling system 100 may represent the transmitting information handling system, or an information handling system located remotely from the transmitting information handling systems. The intelligent contextual virtual background management system 170 in each of these embodiments may gather various input values from a plurality of information handling systems executing the MMCA (e.g., 150) over time in order to determine optimized settings for each of the plurality of information handling systems to decrease processing burden at each information handling system.

The multimedia processing control API 160 in an embodiment may operate to facilitate communication between various applications, controllers, and drivers of the information handling system 100 in an embodiment. For example, in an embodiment in which the neural network is trained remotely from the information handling system 100 (e.g., the information handling system represents a transmitting information handling system), the multimedia processing control API 160 may operate to gather input values for the neural network from the input/output driver 123, sensor driver 131, multimedia framework pipeline and infrastructure platform 140, processor 110, main memory 101, power management unit 103, network interface device 109, or MMCA 150 (e.g., via bus 108). The multimedia processing control API 160 in such an embodiment may transmit such gathered inputs to the remotely located system for training the neural network via network interface device 109 and network 107 in embodiments in which the neural network is trained remotely from the information handling system 100. The trained neural network may then be executed in the same remote location, or may be transmitted to the information handling system 100 via network 107 for storage in main memory 101, static memory 102, or drive unit 106 (e.g., as instructions 174). In an embodiment in which the neural network is trained at the information handling system 100, the multimedia processing control API 160 may transmit the gathered inputs to the intelligent contextual virtual background management system 170 operating at the information handling system 100 (e.g., as instructions 174).

Upon execution of the trained neural network (e.g., as instructions 174) in an embodiment, and during execution of a user session via the MMCA 150, the multimedia processing control API 160 may gather current input values for the trained neural network in a similar manner as the training session. The multimedia processing control API 160 in such an embodiment may transmit such gathered inputs to the intelligent contextual virtual background management system (or agent) 170 executing the trained neural network (e.g., instructions 174). The trained neural network may then output optimized virtual background selection instructions, optimized boundary detection algorithm selection instructions, or optimized offload instructions to the multimedia framework pipeline and infrastructure platform 140.

In an embodiment, a camera operating as the input/output device 122 may capture video of a user of the information handling system, and transmit the captured video sample to the multimedia framework pipeline and infrastructure platform via a streaming media driver or video driver operating as input/output driver 123. In another example of such an embodiment, a microphone operating as the input/output device 122 may capture audio of a user of the information handling system, and transmit the captured audio sample to the multimedia framework pipeline and infrastructure platform via a streaming media driver or audio driver operating as input/output driver 123. The multimedia framework pipeline and infrastructure platform 140 may apply one or more A/V processing instruction modules, including a virtual background module and a boundary detection module to the captured video or audio samples. The multimedia framework pipeline and infrastructure platform 140 in such an embodiment may engage the processor 110 (e.g., CPU, GPU, VPU, GNA) identified within the offload instructions to execute such A/V processing instruction modules on the captured video or audio samples to generate a processed, encoded media sample combining the video and audio samples. By capturing and processing the audio and video samples using these optimized instructions, the intelligent contextual virtual background management system 170 may direct various components of the transmitting information handling system (e.g., 100) to use less CPU (e.g., 110) resources during such processing, and to decrease the streaming data size for the resulting media sample. The MA/ICA 150 may then direct transmission of the processed, encoded media sample to other information handling systems operated by other participants of the user session for the MMCA 150, via network interface device 109 and network 107.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

Information handling system 100 may include devices or modules that embody one or more of the devices or execute instructions for the one or more systems and modules described herein, and operates to perform one or more of the methods described herein. The information handling system 100 may execute code instructions 174 that may operate on servers or systems, remote data centers, or on-box in individual client information handling systems according to various embodiments herein. In some embodiments, it is understood any or all portions of code instructions 174 may operate on a plurality of information handling systems 100.

The information handling system 100 may include a processor 110 such as a CPU, GPU, VPU, GNA, control logic or some combination of the same. Any of the processing resources may operate to execute code that is either firmware or software code. Specifically, the processor 110 may operate to execute code instructions of firmware for the input/output driver 123 in an embodiment. Moreover, the information handling system 100 may include memory such as main memory 101, static memory 102, or other memory of computer readable medium 172 storing instructions 174 of the intelligent contextual virtual background management system 170 for optimizing execution of a user session of the MMCA 150, and drive unit 106 (volatile (e.g., random-access memory, etc.), nonvolatile memory (read-only memory, flash memory etc.) or any combination thereof. A processor 110 may further provide the information handling system with a system clock for which a time of day clock may be tracked along with any location detector such as global positioning system or in coordination with a network interface device 109 connecting to one or more networks 107. The information handling system 100 may also include one or more buses 108 operable to transmit communications between the various hardware components such as any combination of various input and output (I/O) devices.

The network interface device 109 may provide wired or wireless connectivity to a network 107, e.g., a wide area network (WAN), a local area network (LAN), wireless local area network (WLAN), a wireless personal area network (WPAN), a wireless wide area network (WWAN), or other network. Connectivity may be via wired or wireless connection. The network interface device 109 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. In some aspects of the present disclosure, one network interface device 109 may operate two or more wireless links. Network interface device 109 may also connect to any combination of macro-cellular wireless connections including 2G, 2.5G, 3G, 4G, 5G or the like. Utilization of radiofrequency communication bands according to several example embodiments of the present disclosure may include bands used with the WLAN standards and WWAN carriers, which may operate in both licensed and unlicensed spectrums.

In some embodiments, software, firmware, dedicated hardware implementations such as application specific integrated circuits, programmable logic arrays and other hardware devices may be constructed to implement one or more of some systems and methods described herein. For example, some embodiments may include operation of embedded controllers for various applications or input/output devices 122.

Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 174 or receives and executes instructions, parameters, and profiles 174 responsive to a propagated signal, so that a device connected to a network 107 may communicate voice, video or data over the network 107. Further, the instructions 174 may be transmitted or received over the network 107 via the network interface device 109.

The information handling system 100 may include a set of instructions 174 that may be executed to cause the computer system to perform any one or more of the methods or computer-based functions disclosed herein. As an example, instructions 174 may execute an intelligent contextual virtual background management system 170, software agents, or other aspects or components. Various software modules comprising application instructions 174 may be coordinated by an operating system (OS), and/or via an application programming interface (API). An example operating system may include Windows®, Android®, and other OS types. Example APIs may include Win 32, Core Java API, or Android APIs.

The disk drive unit 106 and the intelligent contextual virtual background management system 170 may include a computer-readable medium 172 in which one or more sets of instructions 174 such as software may be embedded. Similarly, main memory 101 and static memory 102 may also contain a computer-readable medium for storage of one or more sets of instructions, parameters, or profiles 174. The disk drive unit 106 and static memory 102 may also contain space for data storage. Further, the instructions 174 may embody one or more of the methods or logic as described herein. For example, instructions relating to the intelligent contextual virtual background management system 170, code instructions of a trained neural network, software algorithms, processes, and/or methods may be stored here. In a particular embodiment, the instructions, parameters, and profiles 174 may reside completely, or at least partially, within the main memory 101, the static memory 102, and/or within the disk drive 106 during execution by the processor 110 of information handling system 100. As explained, some of or all the intelligent contextual virtual background management system 170 may be executed locally or remotely. The main memory 101 and the processor 110 also may include computer-readable media.

Main memory 101 may contain computer-readable medium, such as RAM in an example embodiment. An example of main memory 101 includes random access memory (RAM) such as static RAM (SRAM), dynamic RAM (DRAM), non-volatile RAM (NV-RAM), or the like, read only memory (ROM), another type of memory, or a combination thereof. Static memory 102 may contain computer-readable medium (not shown), such as NOR or NAND flash memory in some example embodiments. The intelligent contextual virtual background management system 170 may be stored in static memory 102, or the drive unit 106 on a computer-readable medium 172 such as a flash memory or magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may further include a power management unit (PMU) 103 (a.k.a. a power supply unit (PSU)). The PMU 103 may manage the power provided to the components of the information handling system 100 such as the processor 110 (e.g., CPU) or alternate processor 111 (GPU, VPU, GNA, etc.), a cooling system such as a bank of fans, one or more drive units 106, the video/graphic display device 120, and other components that may require power when a power button has been actuated by a user. In an embodiment, the PMU 103 may be electrically coupled to the bus 108 to provide this power. The PMU 103 may regulate power from a power source such as a battery 104 or A/C power adapter 105. In an embodiment, the battery 104 may be charged via the A/C power adapter 105 and provide power the to the components of the information handling system 100 when A/C power from the A/C power adapter 105 is removed.

The information handling system 100 may also include the intelligent contextual virtual background management system 170 that may be operably connected to the bus 108. The intelligent contextual virtual background management system 170 computer readable medium 172 may also contain space for data storage. The intelligent contextual virtual background management system 170 may, according to the present description, perform tasks related to optimizing processing of captured media samples for transmission to other information handling systems during execution of a user session of the MMCA 150. The intelligent contextual virtual background management system 170 in an embodiment may execute code instructions of a trained neural network to determine an output for optimized virtual background selection instruction and one or more optimized MMCA processor utilization instructions such as an optimized boundary detection algorithm selection instructions, or an offload instructions for achieving this goal. In such an embodiment, the intelligent contextual virtual background management system 170 may have a convolutional neural network that is trained by receiving, as training input, processing or system capabilities, current or default virtual backgrounds applied, current or default boundary detection algorithms used, current or default offload instructions, user-labeled geographic location, or average ambient brightness across such a plurality of information handling systems.

In an embodiment, the intelligent contextual virtual background management system 170 may be code instructions and operate with the main memory 101, the processor 110, the alternate processor 111, the multimedia processing control API 160, various embedded controllers and the NID 109 via bus 108, and several forms of communication may be used, including ACPI, SMBus, a 24 MHZ BFSK-coded transmission channel, or shared memory. Driver software, firmware, controllers, and the like may communicate with applications on the information handling system 100.

Keyboard or touchpad driver software, firmware, controllers and the like may communicate with applications on the information handling system 100, for example via the input/output driver 123 or the sensor driver 131. Similarly, video display driver software, firmware, controllers and the like may communicate with applications on the information handling system 100, for example, via the display driver 121. In other embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module may include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module may also include a combination of the foregoing examples of hardware or software. In an embodiment an information handling system 100 may include an integrated circuit or a board-level product having portions thereof that may also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another may communicate directly or indirectly through one or more intermediaries.

Figure 2:
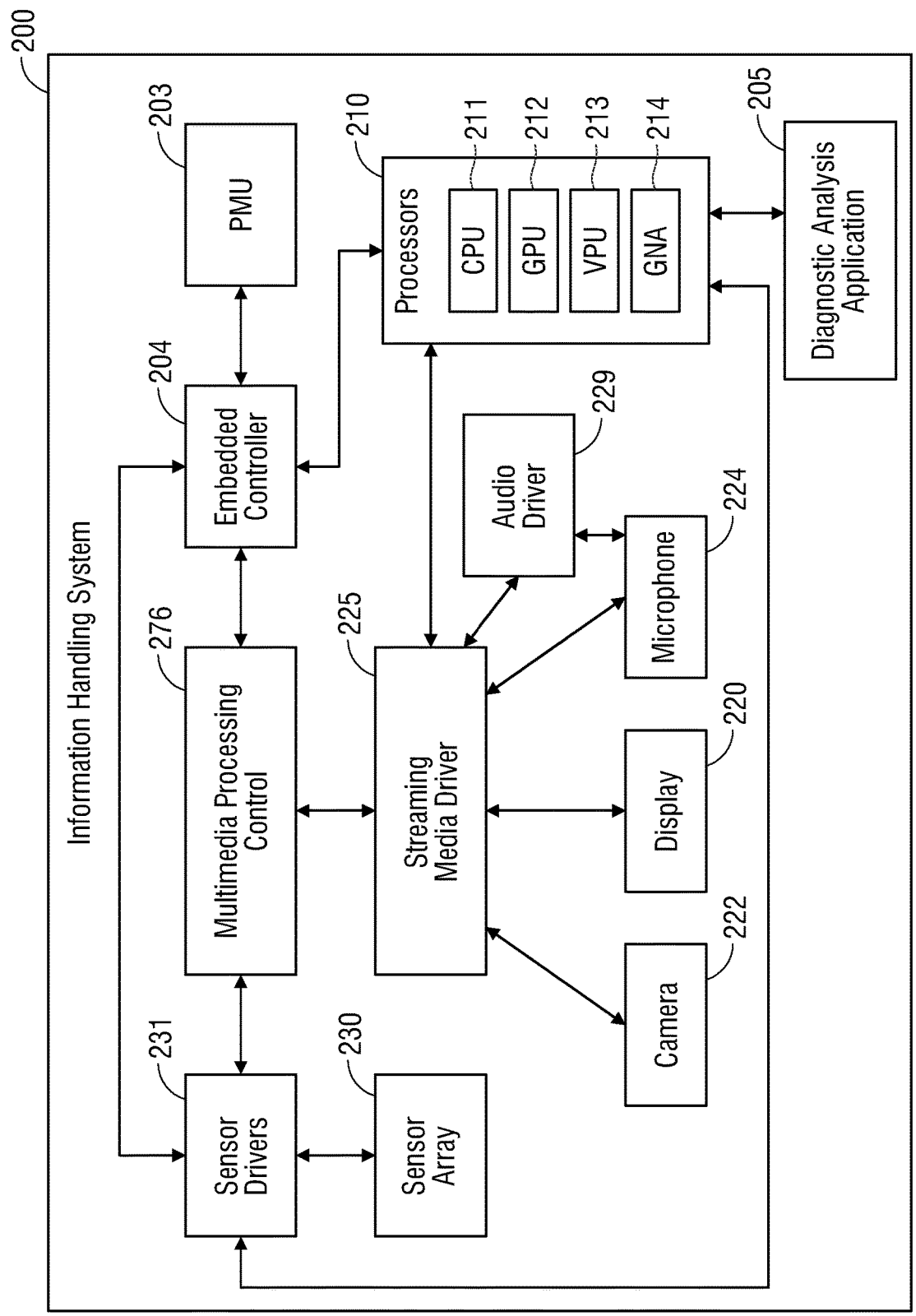
FIG. 2 is a block diagram illustrating various drivers and controllers in communication with a plurality of peripheral devices of an information handling system according to an embodiment of the present disclosure.

FIG. 2 is a block diagram illustrating various drivers and controllers in communication with a plurality of peripheral devices, software applications, and one or more processors according to an embodiment of the present disclosure. As described herein, the intelligent contextual virtual background management system may optimize A/V processing instructions for processing media samples captured by peripheral devices during user sessions for a multimedia multi-user collaboration application (MMCA). The intelligent contextual virtual background management system may modify settings for A/V processing instruction modules applied to such captured media samples, or the type of processor used to perform such A/V processing instruction modules in order to optimize performance of the MMCA on one or more information handling systems in an embodiment.

A neural network of the intelligent contextual virtual background management system in an embodiment may make such optimization determinations for each individual information handling system (e.g., 200) separately. Such a determination may be made based upon a plurality of inputs describing hardware and software capabilities and performance metrics of the information handling system at issue, current or default virtual backgrounds applied, current or default boundary detection algorithms used, current or default offload instructions, user-labeled geographic location of the information handling system (e.g., at a location labeled by the user as private, such as a master bedroom), or average ambient brightness surrounding the information handling system.

These neural network input values may be gathered from a plurality of sensors, peripheral devices, and diagnostic applications. For example, hardware performance metrics describing total processing load at one or more processors 210 may be gathered via an embedded controller 204 in an embodiment. The embedded controller 204 may also gather information describing state of charge for a power management unit 203, which may include a battery and an AC adapter, as described with reference to FIG. 1. Such state of charge information may be gathered by the embedded controller 204 in an embodiment while the information handling system 200 is operating solely on battery power, and when the PMU 203 is receiving power via the AC adapter. The embedded controller 204 in an embodiment may gather such metrics through direct communication with the processor 210 (e.g., CPU, GPU, VPU, GNA, etc.) and with the power management unit (PMU) 203. In some embodiments, such communication may occur in kernel mode.

As described in greater detail with reference to FIG. 5, the intelligent contextual virtual background management system may be integrated, in whole or in part, in some embodiments within an information handling system performance optimizer application located remotely from the information handling system 200. In such an embodiment, the information handling system performance optimizer application may operate to manage security credentials, connectivity credentials, performance optimization, software updates, and other various routine computing maintenance tasks for a plurality of information handling systems (e.g., including 200) owned by an enterprise business or produced by a single manufacturer. The Dell® Optimizer® software application is one example of such an information handling system performance optimizer application. The information handling system performance optimizer application in such an embodiment may communicate with the embedded controller 204 to receive high-level hardware performance metrics from each of the plurality of information handling systems (e.g., including 200) it manages during routine out-of-band communications between the information handling system performance optimizer application and all managed information handling systems. Such out-of-band communications with the embedded controller 204 in an embodiment may be used to check security credentials or performance statistics for the information handling systems (e.g., 200), or to push software or firmware updates to the information handling systems, for example. During such routine maintenance, the information handling system performance optimizer application may accumulate, sort, and analyze all performance metrics received from all managed information handling systems (e.g., 200), including processing load across all available processors 210 (e.g., CPU, GPU, VPU, GNA), default settings associating specific processors (e.g., 210) with specific tasks, or state of remaining charge of the battery incorporated within the PMU 203, for example. Out-of-band communications initiated in such a way between the embedded controller 204 and the information handling system performance optimizer application may be via a wireless network such as Wi-Fi or cellular, or via wired connection. Such out-of-band communications operate without need for Operating System intervention or function and may operate behind the scenes to ensure optimized function for managed information handling systems.

As another example of gathering inputs for a neural network of the intelligent contextual virtual background management system, software performance metrics may be generated at a diagnostic analysis application 205, based at least in part on communication between the diagnostic analysis application 205 and the processor 210. Such a diagnostic analysis application 205 may operate to gather metrics describing CPU usage or load, as well as a breakdown of the CPU usage attributable to each of a plurality of applications (e.g., including a MMCA) running via the operating system of the information handling system 200. In some embodiments, the diagnostic analysis application 205 may provide similar metrics for other types of processors for the information handling system, including, for example, a graphics processing unit (GPU), vision processing unit (VPU), or gaussian neural accelerator (GNA). One example of such a diagnostic analysis application 205 in an embodiment may include the Microsoft® Diagnostic Data Viewer® software application. As described in greater detail with respect to FIG. 5, these software performance metrics may be generated at the diagnostic analysis application 205 and transmitted to the neural network of the intelligent contextual virtual background management system via multimedia processing controller API 276.

In yet another example of gathering inputs for a neural network of the intelligent contextual virtual background management system, various sensor readings may be taken by the information handling system 200 and communicated to the intelligent contextual virtual background management system. More specifically, the information handling system 200 may include one or more sensors within a sensor array 230. Such sensors may include, for example, a configuration sensor (e.g., a hall effect sensor or hinge rotation sensor, accelerometer, gyroscope, orientation sensor, light sensors, IR cameras, etc.) capable of detecting a current configuration base portion or display portion of a laptop or tablet information handling system (e.g., 200). For example, such a configuration sensor may be capable of identifying whether a convertible laptop or dual tablet information handling system (e.g., 200) is placed in a closed, open clamshell, tablet, or tent configuration.

Other examples of sensors within the sensor array 230 may include light sensors, infrared (IR) cameras, or geographic position sensors (e.g., GPS units). In some embodiments, one or more modules of the network interface device described with reference to FIG. 1 may constitute one of the sensors within the sensor array 230. For example, an antenna front end system of the network interface device may operate to determine GPS coordinates based on connection to one or more Wi-Fi networks or cellular networks. The GPS coordinates of the information handling system 200 and identification of one or more Wi-Fi networks or cellular networks to which the information handling system 200 connects may constitute sensor readings gathered at the sensor drivers 231 in an embodiment. All sensor readings from sensors within the sensor array 230 in an embodiment may be transmitted to the sensor drivers 231. As described in greater detail with respect to FIG. 5, these sensor readings may be transmitted from the sensor drivers 231 to the neural network of the intelligent contextual virtual background management system via the processor 210 and a multimedia processing controller API 276.

In still another example of gathering inputs for a neural network of the intelligent contextual virtual background management system, default or current virtual background applied, and default or current boundary detection algorithms used may be gathered via a streaming media driver 225 and transmitted to the intelligent contextual virtual background management system. In other embodiments, such default or current virtual background applied and default or current boundary detection algorithms used may be gathered from the multimedia framework pipeline and infrastructure platform, as described in greater detail with reference to FIG. 5. The streaming media driver 225 may also gather audio samples recorded at a microphone 224, or images captured by the camera 222 as another input into the neural network. For example, such images captured by the camera 222 in an embodiment may be used to determine ambient average brightness surrounding the information handling system, which may affect selection of an optimized virtual background or optimized boundary detection algorithm. It is contemplated that the information handling system 200 may include a plurality of cameras (e.g., one camera for each of a plurality of videoconferencing displays oriented at different angles to a user), a plurality of displays (e.g., 220), and a plurality of microphones 224.

Figure 3:
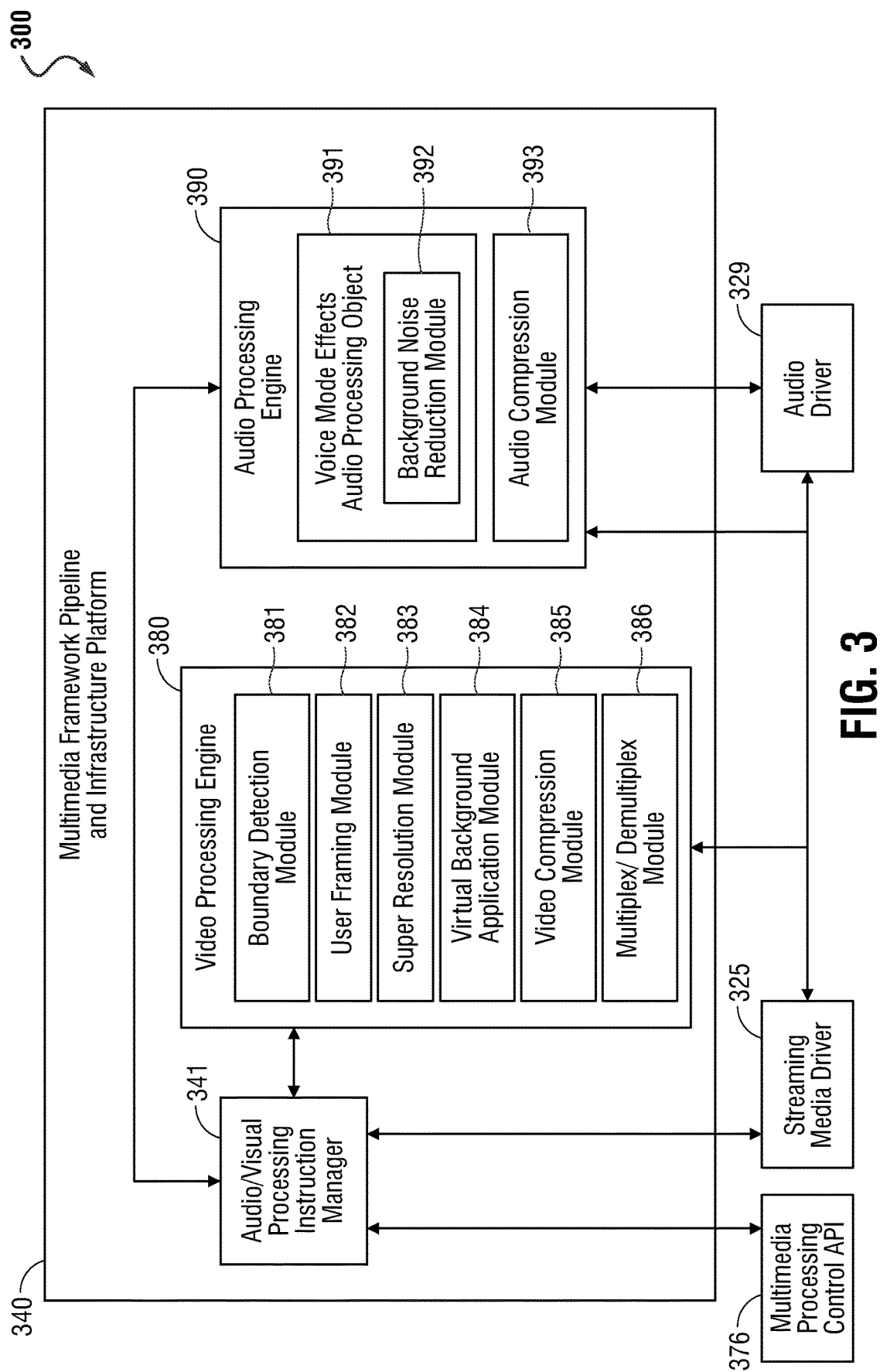
FIG. 3 is a block diagram illustrating a multimedia framework pipeline and infrastructure platform of an information handling system according to an embodiment of the present disclosure.

FIG. 3 is a block diagram illustrating a multimedia framework pipeline and infrastructure platform in communication with a plurality of drivers in order to process captured media samples according to an embodiment of the present disclosure. As described herein, the intelligent contextual virtual background management system may optimize various settings for processing of media samples captured at or received by an information handling system, during execution of user sessions for a multimedia multi-user collaboration application (MMCA). The intelligent contextual virtual background management system may optimize such settings in order to optimize performance of the MMCA in an embodiment.

The multimedia framework pipeline and infrastructure platform 340 may process media samples captured at the information handling system executing the multimedia framework pipeline and infrastructure platform 340 in one aspect of an embodiment. An example of such a multimedia framework pipeline and infrastructure platform 340 may include the Microsoft® Media Foundation Platform® for Windows®. The multimedia framework pipeline and infrastructure platform 340 in an embodiment may manage audio and video playback quality, interoperability, content protection, and digital rights management. The multimedia framework pipeline and infrastructure platform 340 may operate to retrieve audio and video samples from a media source, perform one or more processing methods on the retrieved audio and video samples, multiplex the audio and video samples together to form a processed media sample, and transmit the processed media sample to a media sink.

The multimedia framework pipeline and infrastructure platform 340 in an embodiment may include an audio/visual (A/V) processing instruction manager 341, a video processing engine 380, and an audio processing engine 390. The video processing engine 380 and audio processing engine 390 may each perform A/V processing methods or algorithms to transform media samples. Several of such methods may be performed serially to transform a single media sample in an embodiment, such as via a chaining algorithm. The A/V processing instruction manager 341 in an embodiment may schedule or otherwise manage performance of each of these methods, in turn.

In one aspect of an embodiment, a camera or microphone operably connected to the information handling system 300 may operate as the media source. In such an embodiment, the A/V processing instruction manager 341 in an embodiment may operate to retrieve a media sample from a media source, based on a media capture instruction. The A/V processing instruction manager 341 may transmit a media capture instruction to the streaming media driver 325 in an embodiment. As described in greater detail with respect to FIG. 5, the multimedia framework pipeline and infrastructure platform 340 may also be in communication with the MICA and a multimedia processing control API 376. Via such communications, the multimedia framework pipeline and infrastructure platform 340 may receive media capture instructions from the MMCA.

The streaming media driver 324 in such an embodiment may receive video or audio samples captured by peripheral cameras or microphones in communication therewith, according to media capture instructions, as described with reference to FIG. 2. In another embodiment, the audio driver 329 may receive audio samples captured by a microphone in communication therewith, according to such received media capture instructions. In such an embodiment, the audio driver 329 may operate as a mini-driver or child device to the parent device streaming media driver 324. The streaming media driver 325 may be in communication with the A/V processing instruction manager 341 via one or more ports (e.g., as described in greater detail with respect to the device proxy 442 of FIG. 4) such that video or audio samples received by the streaming media driver 325 may be transmitted to the A/V processing instruction manager 341 in an embodiment. The audio driver 329 may be in communication with the A/V processing instruction manager 341 such that audio samples received by the audio driver 329 may be transmitted to the A/V processing instruction manager 341 (e.g., via the audio processing engine 390, or via the streaming media driver 325) in an embodiment. In such a way, the A/V processing instruction manager 341 may direct retrieval of a video sample captured at a camera operably connected to information handling system 300 and retrieval of an audio sample captured at a microphone operably connected to information handling system 300.

The A/V processing instruction manager 341 may direct the type or the order in which various A/V processing instruction modules, are employed on media samples. The video processing engine 380 may operate to apply one or more video processing A/V processing instruction modules to a video sample, each implemented by a separate module, according to execution instructions received from the A/V processing instruction manager 341. The audio processing engine 390 may operate to apply one or more audio processing A/V processing instruction modules to an audio sample, each implemented by a separate audio processing object, according to execution instructions received from the A/V processing instruction manager 341. The one or more A/V processing instruction modules may include application of a codec to compress each of the audio sample and the video sample as required for transmission of media samples across the internet, and playback of those media samples by a MMCA, and a multiplexer to coalesce the compressed audio sample and compressed video sample into a processed, encoded (e.g., by a codec) media sample. Other processing methods in an embodiment may be dictated by one or more features of the MMCA, or optimized instructions received from the intelligent contextual virtual background management system, as described herein.

The video processing engine 380 may operate at the direction of the A/V processing instruction manager 341 to perform one or more of the algorithms associated with the plurality of modules within the video processing engine 380. For example, the boundary detection module 381 in an embodiment may operate to detect a boundary of a user within a captured video sample, through application of a boundary detection algorithm. The boundary detection module 381 in an embodiment may be capable of performing this task through execution of a variety of available boundary detection algorithms, each associated with varying processing demands, basic requirements, and resulting quality levels. For example, higher-quality boundary detection algorithms, such as image matting algorithms, may successfully define the boundaries of a user, even in low-lighting conditions, but may be associated with relatively higher processing demands (e.g., likely to consume more processing resources during its execution). Such higher-quality boundary detection algorithms may further identify a user's hand within the boundary of the user such that the virtual background does not obscure the user's hand, so as to provide a more polished and thoroughly accurate representation of the user.

As another example, lower-quality boundary detection algorithms, such as image segmentation algorithms may not be suitable for low-lighting conditions, but may be associated with relatively lower processing demands (e.g., likely to consume less processing resources during its execution), thus conserving processing resources for execution of other applications during a videoconference. Such lower quality boundary detection algorithms may fail to identify a user's hand within the boundary of the user, leading to the user's hand being obscured by application of a virtual background, or in the user's hand inconsistently being obscured. Thus, lower-quality boundary detection algorithms may optimize processor resources consumed, while producing a less polished video of the user, appropriate for more casual videoconferences. In contrast, higher-quality boundary detection algorithms may produce a more polished and professional video of the user, appropriate for communications with customers, clients, and superiors, at the expense of processor resource load. As described in greater detail with respect to FIGS. 7 and 8, the neural network of the intelligent contextual virtual background management system in an embodiment may identify a boundary detection algorithm optimized to meet one of these goals (e.g., more polished product or conservation of CPU resource load) based on contextual inputs describing the organizational rankings of each of the participants, the user-labeled geographic location of the user, the ambient lighting within the captured image, and the current CPU resource load.

The virtual background application module 384 in an embodiment may apply a virtual background surrounding the detected boundary of the user within the captured image or video of the user. The virtual background application module 384 in an embodiment may be capable of performing this task through execution of a variety of available virtual backgrounds, each associated with varying streaming file sizes (e.g., depending on resolution of the background image applied), and varying average brightness values. These variable qualities may affect quality of the virtual background applied, as well as processing resources required for its application. For example, higher-quality virtual backgrounds, such as higher resolution images may increase the streaming file size of the media sample once the virtual background is applied, and thus consume relatively more processing resources during its execution, but may present a highly polished image of the user. As another example, lower-quality virtual backgrounds, such as lower resolution images may consume fewer processing resources during application, but may present a less polished image of the user. In yet another example, a virtual background having an average brightness that differs from the average brightness of the user in the video may increase contrast between the user and the background, also resulting in a more polished video.

Thus, lower-quality virtual backgrounds may optimize processor resources consumed, while producing a less polished video of the user, appropriate for more casual videoconferences. In contrast, higher-quality virtual backgrounds may produce a more polished and professional video of the user, appropriate for communications with customers, clients, and superiors, at the expense of processor resource load. As described in greater detail with respect to FIGS. 7 and 8, the neural network of the intelligent contextual virtual background management system in an embodiment may identify a virtual background selection instruction optimized to meet one or more of these goals (e.g., more polished product, conservation of CPU resource load, increased contrast between user and virtual background applied) based on contextual inputs describing the organizational rankings of each of the participants, the user-labeled geographic location of the user, the ambient lighting within the captured image, and the current CPU resource load.

The user framing module 382 in an embodiment may operate to identify a user's face and center the user's face within each captured image making up the video sample. In an embodiment, the super resolution module 383 may recover a high-resolution image from a low-resolution image, using a known degradation function. It is contemplated other A/V processing instruction modules known in the art may also be employed, such as a hand detection algorithm, for example.

The compression module 385 in an embodiment may perform one or more algorithms or digital transforms to compress or decompress the received and processed video sample. Various compression algorithms may be employed in various embodiments. In some embodiments, the compression algorithm used may conform to one or more standards, selected or identified for use by the MMCA. For example, the MMCA may require all media samples transmitted to sinks (e.g., Universal Resource Identifiers or URIs) accessible by various agents or APIs of the MMCA executing across a plurality of information handling systems, adhere to the Motion Picture Experts Group 4 (MPEG-4) standard established by a Joint Technical Committee (JTC) of the International Organization for Standardization and International Electrotechnical Commission (IOS/IEC). This is only one example of a standard required by the MMCAs in an embodiment, and is meant to be illustrative rather than limiting. It is contemplated the video processing engine 380 in an embodiment may include various modules for encoding or decoding video samples or media samples using any known, or later developed standards.

The MPEG-4 standard may define one or more algorithms or A/V processing instruction modules (e.g., reduced-complexity integer discrete cosine transform) that may be used to compress and decompress video samples or audio samples. For example, the H.264 Advanced Video Coding (AVC), defined by part 10 of the MPEG-4 standard is the most widely used codec by video developers. Other video compression algorithms available under the MPEG-4 standard may also define 3D graphics compression (e.g., part 25), web video coding (e.g., part 29), internet video coding (e.g., part 33), and video coding for browsers (e.g., part 31). Each of these compression algorithms may be associated with different processing requirements for coding or decoding streaming media data in an embodiment. For example, the H.264 compression algorithm may require more processing resources than the video coding for browsers compression algorithm. Thus, the load placed on the processor executing such algorithms in an embodiment may be increased or decreased by choosing one of these compression algorithms over another.

Upon application of all other A/V processing instruction modules (e.g., 381, 382, 383, 384, and 385) in an embodiment, the multiplex module 386 may combine or coalesce the processed video sample and the processed audio sample into a single, processed and encoded (e.g., via the video compression module 385) media sample for transmission. The same, similar, or complimentary A/V processing instruction modules may be performed on remotely captured media samples received at the information handling system 300 for demultiplexing, decoding, and display or presentation on the information handling system 300, as described in greater detail below. The boundary detection module 381, user framing module 382, super resolution module 383, and virtual background application module 384 may comprise A/V processing instruction modules, which may comprise machine executable code instructions executing at various controllers or processors of the information handling system 300. Any one or more of the boundary detection module 381, user framing module 382, super resolution module 383, virtual background application module 384 or other A/V processing instruction modules routinely applied pursuant to instructions received from the MMCA (e.g., eye contact detection module, zoom and face normalizer module) may be applied to a captured video sample in an embodiment. Further, each of the algorithms executed by these modules (e.g., 381, 382, 383, and 384) may be implemented in any order. In some embodiments, one or more of the algorithms executed by these modules (e.g., 381, 382, 383, and 384) may be skipped. In other embodiments, the video processing engine 380 may skip the algorithms executed by each these modules (e.g., 381, 382, 383, and 384), and may only perform compression of the video sample via the video compression module 385, and multiplexing of the encoded or compressed video sample with the encoded or compressed audio sample via module 386.

The audio processing engine 390 may operate to process audio samples, and may include, for example, a voice mode effects audio processing object 391 and an audio compression module 393. The audio compression module 393 in an embodiment may apply a compression algorithm or codec to the captured audio sample to compress it. Several audio codecs may be used under part 3 of the MPEG-4 standard, including Advanced Audio Coding (AAC), Audio Lossless Coding (ALS), and Scalable Lossless Coding (SLS), among others. As with the video compression algorithms described directly above, each of these audio compression algorithms may be associated with different processing requirements for coding or decoding streaming audio samples in an embodiment. Thus, the choice of audio compression algorithm may affect load placed on the processor executing such algorithms in an embodiment.

The voice mode effects audio processing object 391 in an embodiment may include modules for application of other digital signal processing effects, including, for example, a background noise reduction module 392. In an embodiment, the background noise reduction module 392 may operate to isolate the user's voice from surrounding background noise and either amplify the user's voice, or reduce or remove the background noise. In other embodiments, the voice mode effects audio processing object 391 may include other modules for further digital signal processing effects, including voice modulation, graphic equalization, reverb adjustment, tremolo adjustment, acoustic echo cancellation, or automatic gain control. It is contemplated any known or later developed digital signal processing effects commonly used in MMCAs may also be executed as one or more modules within the voice mode effects audio processing object 391 in various embodiments. Any one or more of these voice mode effects audio process object modules (e.g., 392) may be applied to a captured audio signal in an embodiment. In other embodiments, the audio processing engine 390 may apply no voice mode effects audio processing object digital signal processes, and may only perform compression of the audio sample via the audio compression module 393. As described directly above, following processing and encoding or compression of the audio sample in such a way, the A/V processing instruction manager 341 may instruct the video processing engine 381 to multiplex or combine the processed and encoded video sample with the processed and encoded audio sample to generate a processed and encoded media sample. In such a way, the video processing engine 380 and audio processing engine 390, operating pursuant to execution instructions received from the A/V processing instruction manager 341, may combine an audio sample with a video sample, both captured at the information handling system 300, into a single, processed and encoded media sample, such that the processed and encoded media sample may be transmitted or streamed to other information handling systems via a network (e.g., the world wide web). In such a way, the multimedia framework pipeline and infrastructure platform 340 may operate to retrieve audio and video samples from a media source, perform one or more processing methods on the retrieved audio and video samples, multiplex the audio and video samples together to form a processed media sample, and transmit the processed media sample to a media sink.

Figure 4:
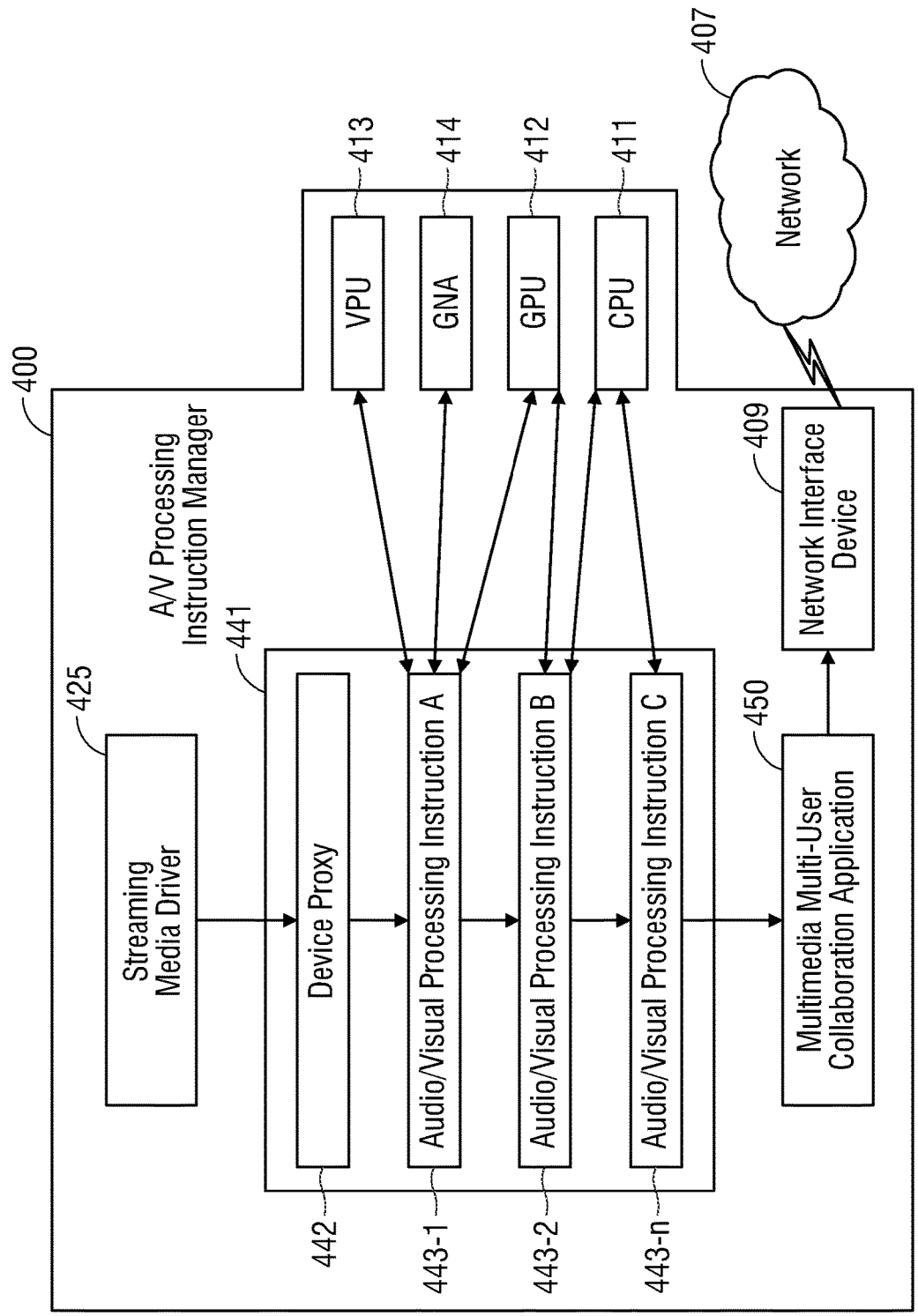
FIG. 4 is a block diagram illustrating audio/visual (A/V) processing instruction manager for optimizing information handling system operation of a multimedia, multi-user collaboration application (MMCA) according to an embodiment of the present disclosure.

FIG. 4 is a block diagram illustrating an A/V processing instruction manager operating to process media samples transmitted between a streaming media driver and a multimedia multi-user collaboration application (MMCA) of an information handling system according to an embodiment of the present disclosure. The A/V processing instruction manager 441 of a multimedia framework pipeline and infrastructure platform may operate to retrieve audio and video samples from a camera or microphone, perform one or more processing methods on the retrieved audio and video samples, multiplex the audio and video samples together to form a processed media sample, and transmit the processed media sample from a media source information handling system to a media sink information handling system.

Upon capture of such video samples and audio samples in an embodiment, the streaming media driver 425 (or other drivers) may transmit the captured video and audio samples to the A/V processing instruction manager 441 via a device proxy 442. The device proxy 442 in an embodiment may comprise code instructions operating at a controller. In an embodiment, the device proxy 442 may route or map connections between physical pins of the streaming media driver 425 (or other drivers) and the A/V processing instruction manager 441. The streaming media driver 425 may comprise firmware or software code instructions executable to allow communication between various media hardware (e.g., camera, microphone, speakers, display) and the operating system (OS). The A/V processing instruction manager 441 in an embodiment may comprise code instructions executable within the OS environment via one or more processors (e.g., VPU 413, GNA 414, GPU 412, or CPU 411) of the information handling system 400. As the A/V processing instruction manager 441 manages execution of either a video sample or an audio sample in such an embodiment, the A/V processing instruction manager 441 may employ the device proxy 442 to retrieve the video sample from one of the physical pins within a driver operably connected to the camera prior to execution of a video processing method. Similarly, the A/V processing instruction manager 441 may employ the device proxy 442 to retrieve the audio sample from one of the physical pins within a driver operably connected to the microphone prior to execution of an audio processing method. The communication between the streaming media driver 425 and the device proxy 442 in such an embodiment may be executed by the A/V processing instruction manager 441 executing code in kernel mode on the CPU 411 in an embodiment.

The A/V processing instruction manager 441 in an embodiment may apply one or more A/V processing instruction modules, each representing processing methods, on the audio sample and the video sample. For example, the A/V processing instruction manager 441 in an embodiment may perform an A/V processing instruction A 443-1 for detecting the boundary of a user within the captured video sample, perform A/V processing instruction B 443-2 for applying a virtual background around the detected boundary of the user within the captured video sample, and perform any additional A/V processing instruction C 443-n, such as compressing an audio sample or a video sample or multiplexing the processed and encoded audio and video samples together to form a processed and encoded media sample. In such an embodiment, the processed and encoded media sample may then be transmitted or streamed to the MMCA 450, where it will be streamed to a URI in the network 407 via the network interface device 409.

The information handling system 400 in an embodiment may include a plurality of processors, including, for example, a central processing unit (CPU) 411, a graphics processing unit (GPU) 412, a vision processing unit 413, and a gaussian neural accelerator (GNA) 414. The CPU 411 in an embodiment may execute the bulk of tasks relating to all software applications running via the operating system (OS), which may include the MMCA 450, the multimedia framework pipeline and infrastructure platform incorporating the A/V processing instruction manager 441, as well as several others. Increased processing load placed on the CPU 411 by the A/V processing instruction manager 441 during execution of a user session for the MMCA 450 may decrease the processing resources left available for all other applications also running at the OS, which may include word processing applications (e.g., Microsoft® Word®), presentation applications (e.g., Microsoft® PowerPoint®), e-mail applications, web browsers, and other applications routinely used in conjunction with the MMCA throughout a typical workday.

The GPU 412 in an embodiment may be a processor specialized for rapidly manipulating and altering memory to accelerate the creation of a video sample using a plurality of captures images stored in a frame buffer. GPU 412 may be more efficient at manipulating such stored video samples during image processing performed by one or more of the A/V processing instruction modules (e.g., 443-1, 443-2, and 443-n) in an embodiment. The VPU 413 in an embodiment may be specialized for running machine vision algorithms such as convolutional neural networks (e.g., as used by the boundary detection algorithm, super resolution module, zoom and face normalizer module, or eye contact correction modules described with reference to FIG. 3). The GNA 414 in an embodiment may comprise low-power co-processor to the CPU, or a System on a Chip (SoC) that can run under very low-power conditions to perform a specialized task, such as real-time translations of ongoing conversations, or various other audio and video processing methods represented by any one of the A/V processing instruction modules 443-1, 443-2, or 443-n. The GNA 414 may operate in an embodiment to offload continuous inference workloads from the CPU 411, GPU 412, or VPU 413, including but not limited to noise reduction or speech recognition, to save power and free CPU 411 resources.

Each of the A/V processing instruction modules (e.g., 443-1, 443-2, and 443-n) in an embodiment may be sets of algorithms or code instructions executed via the operating system (OS), using one of the processors of the information handling system 400 for modification of video data or audio data relating to streaming video conferencing applications. It is understood that any number of A/V processing instruction modules is contemplated in discussing 443-1 through 443-n. A single processor may execute each of the A/V processing instruction modules (e.g., 443-1, 443-2, and 443-n), a sub-group thereof, or may even execute a single A/V processing instruction, according to various embodiments. The A/V processing instruction manager 441 in an embodiment may determine which processor to access in order to execute each A/V processing instruction (e.g., 443-1, 443-2, and 443-n) in an embodiment, based on offload instructions received from the intelligent contextual virtual background management system in some embodiments. For example, the A/V processing instruction manager 441 in an embodiment may access the VPU 413 or the GNA 414 to execute various video or audio processing algorithms supported by the features of the MMCA, as represented by A/V processing instruction A 443-1, pursuant to an optimized offload instruction to avoid executing that A/V processing instruction using the GPU 412 or CPU 411. As another example in an embodiment, the A/V processing instruction manager 441 may access the GPU 414 or CPU 411 to execute the audio or video compression algorithm represented by A/V processing instruction C 443-n. In yet another example in such an embodiment, the A/V processing instruction manager 441 may access CPU 411 to multiplex the processed and encoded audio and video samples into a processed and encoded media sample. In such a way, the A/V processing instruction manager 441 may retrieve audio and video samples captured at the information handling system and perform one or more processing methods on the captured audio and video samples in accordance with offload instructions received from the intelligent contextual virtual background management system or the MICA 450.

Figure 5:
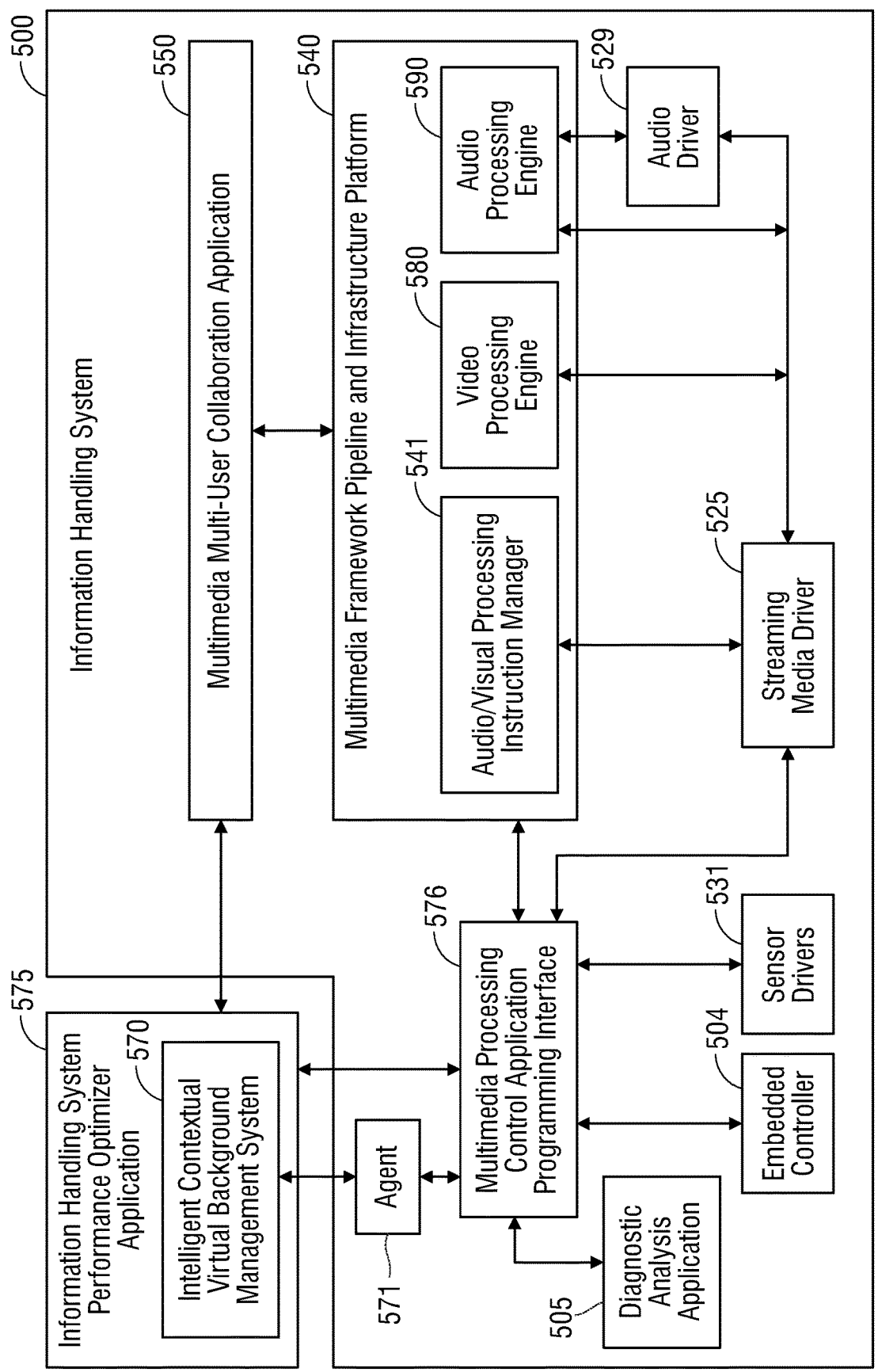
FIG. 5 is a block diagram illustrating a first embodiment of an intelligent contextual virtual background management system for optimizing information handling system operation of an MMCA according to an embodiment of the present disclosure.

FIG. 5 is a block diagram illustrating a first embodiment of an intelligent contextual virtual background management system for directing optimized processing of media samples for display during a user session of a multimedia multi-user collaboration application (MMCA) according to an embodiment of the present disclosure. As described herein, the intelligent contextual virtual background management system 570 are code instructions executing on one or more processors of an information handling system executing the information handling system performance optimizer application 575, or one or more processors of information handling system 500 participating in a videoconference via multimedia multi-user collaboration system 550. The intelligent contextual virtual background management system 570 in an embodiment may generate optimized virtual background selection instructions, optimized boundary detection algorithm selection instructions, or optimized offload instructions for optimizing performance of the MMCA 550, based on organizational rankings of participants within the videoconference, ambient lighting, user-labeled geographic location of the information handling system, and processor resource load.

In one example embodiment, the intelligent contextual virtual background management system 570 may be an application operating within the OS for the information handling system 500, including execution of a trained neural network for determining optimized settings described herein. For example, the information handling system 500 may execute any or all of the intelligent contextual virtual background management system 570 via a processor (e.g., processor 110 executing code instructions of the intelligent contextual virtual background management system 170, described with reference to FIG. 1) or embedded controller 504. In another example embodiment, the intelligent contextual virtual background management system 570 may be an application operating as part of an information handling system performance optimizer application 575 at an information handling system located remotely from the information handling system 500. In such an example embodiment, an agent 571 or portion of the intelligent contextual virtual background management system 570 may be operating at the information handling system 500. The agent 571 of the intelligent contextual virtual background management system 570 in such an embodiment may be in communication with the multimedia processing control API 576 via an internal bus of information handling system 500, and in communication with the information handling system performance optimizer application 575 via a network interface device, as described in greater detail with respect to FIG. 1.

The information handling system performance optimizer application 575 in an embodiment may operate remotely from the information handling system 500 in an embodiment. For example, the information handling system performance optimizer application 575 may operate on a server, blade, rack, or cloud-based network maintained and controlled by the manufacturer of several information handling systems, or managed by an employer or enterprise owner of several information handling systems, including information handling system 500. In such an embodiment, the information handling system performance optimizer application 575 may operate to monitor certain performance metrics at each of the plurality of such information handling systems (e.g., including 500), perform firmware and software updates, confirm security credentials and compliance, and manage user access across the plurality of information handling systems (e.g., as owned by an employer or enterprise corporation, and including 500).

A neural network of the intelligent contextual virtual background management system 570 in an embodiment may make optimization determinations as described herein on a per information handling system basis, or across a plurality of information handling systems in a crowd-sourced approach. Such a determination may be made based upon a plurality of inputs, such as processing or system capabilities, current or default virtual backgrounds applied, current or default boundary detection algorithms used, current or default offload instructions, user-labeled geographic location of the information handling system 500 (e.g., at a location labeled by the user as private, such as a master bedroom), or average ambient brightness surrounding the information handling system 500. These neural network input values may be gathered from a plurality of sensors, peripheral devices, and diagnostic applications, such as described in various example embodiments herein.

The multimedia processing control application programming interface 576 in an embodiment may operate, at least in part, as a hub, facilitating communication of each of these inputs to the intelligent contextual virtual background management system 570, or agent 571 thereof. For example, processing capabilities may indicate processor types available or Random Access Memory (RAM) or other memory capabilities of an information handling system. In a further example, hardware performance metrics describing total processing load at one or more processors may be gathered via an embedded controller 504 in an embodiment, and transmitted to the multimedia processing control API 576. The embedded controller 504 may also gather information describing state of charge for a power management unit, which may include a battery and an AC adapter, as described with reference to FIG. 1. The embedded controller 504 in an embodiment may gather such metrics through direct communication with the available processors (e.g., CPU, GPU, VPU, GNA, etc.) and with the power management unit (PMU). In some embodiments, such communication may occur in kernel mode.

In other embodiments, the information handling system performance optimizer application 575 may be in direct communication with the embedded controller 504 via out-of-band communications. In such embodiments, the hardware performance metrics (e.g., CPU load, current MMCA processor settings, battery state of charge, current positional configuration of information handling system 500) may be determined by the embedded controller 504 in kernel mode and communicated to the information handling system performance optimizer application 575 directly during routine out-of-band communications between the information handling system performance optimizer application 575 and all managed information handling systems (e.g., including 500). Such out-of-band communications with the embedded controller 504 in an embodiment may be used to check security credentials or performance statistics for the information handling systems (e.g., 500), or to push software or firmware updates to the information handling systems, for example. During such routine maintenance, the information handling system performance optimizer application may accumulate, sort, and analyze all performance metrics received from all managed information handling systems (e.g., 500), including processing load across all available processors, default offload instructions associating specific processors with specific tasks, or state of remaining charge of the battery incorporated within the PMU, for example. Out-of-band communications initiated in such a way between the embedded controller 504 and the information handling system performance optimizer application 575 may be via a wireless network such as Wi-Fi or cellular, or via wired connection.

As described herein, the multimedia processing control API 576 may operate, at least in part, as a hub to facilitate communication between various hardware, firmware, and software applications operating at information handling system 500, and the intelligent contextual virtual background management system 570. As another example of this, the multimedia processing control API 576 may receive software performance metrics generated at a diagnostic analysis application 505, describing applications available or running, number of videoconference participants, CPU usage or load, as well as a breakdown of the CPU usage attributable to each of a plurality of applications (e.g., including a MMCA 550) running via the operating system of the information handling system 500. The multimedia processing control API 576 may forward these software performance metrics to the neural network of the intelligent contextual virtual background management system 570 in an embodiment.

In yet another example of the multimedia processing control API 576 facilitating communication with the intelligent contextual virtual background management system 570 the multimedia processing control API 576 may receive sensor readings taken from one or more sensors of the information handling system 500 (e.g., a hall effect sensor or hinge rotation sensor, light sensors, IR cameras, accelerometer, gyroscope, orientation sensor, or geographic position sensors), via the sensor drivers 531, as described in greater detail with respect to FIG. 2. In still another example of the multimedia processing control API 576 facilitating communication with the intelligent contextual virtual background management system 570 the multimedia processing control API 576 may receive default A/V processing instruction module settings (including current or default virtual background selection or boundary detection algorithm). In other embodiments, the multimedia processing control API 576 may receive default A/V processing instruction module settings via direct communication with the multimedia framework pipeline and infrastructure platform 540. In still other embodiments, the intelligent contextual virtual background management system 570 may receive such default A/V processing instruction module settings via direct communication with the MMCA 550.

The intelligent contextual virtual background management system 570 in an embodiment may also communicate directly with the MMCA 550 or indirectly via the multimedia processing control API 576 to gather meeting metrics describing identification of all participants in a videoconference user session, and performance of the MMCA 550 during the user session in which the information handling system 500 participates. The intelligent contextual virtual background management system 570 may receive one or more meeting metrics describing performance of the MMCA during execution of such a training user session in an embodiment. In some embodiments, these metrics may be gathered during routine out-of-band communications between the information handling system performance optimizer application 575 and the information handling system 500. Such meeting metrics may include, for example, a measure of the CPU resources consumed by the MMCA over time. Other example meeting metrics may include a measure of memory resources consumed. Still other example meeting metrics may compare CPU or memory usage by the MMCA 550 to total CPU or memory used by all applications, hardware, or firmware during the training user session.

Such meeting metrics may also describe the performance of media sample processing, transmission, and playback among a plurality of information handling systems (e.g., including 500) engaged in a single user session for the MMCA 550. For example, meeting metrics gathered by the intelligent contextual virtual background management system 570 during a training session may describe latency, or a measurement of time elapsing between a first information handling system (e.g., 500) transmitting the processed, encoded media sample and a second information handling system receiving the processed, encoded media sample. As another example, meeting metrics may include a measurement of jitter, or a comparison between latency of playback for a media sample from one of the meeting participants, and latency of playback for another media sample from another of the meeting participants. Such jitter may cause the two separate media samples, which may have been recorded simultaneously, to playback such that they are out-of-sync with one another. Still other meeting metrics in an embodiment may measure bandwidth consumed by the MMCA 550, type of network used to transmit and receive media samples, packet loss (e.g., of video or audio samples), resolution and frames per second of video samples (both at the transmitting side and the receiving side), audio bitrate (both at the transmitting side and the receiving side), and one or more codecs or compression algorithms in use. In some embodiments, jitter, packet loss, latency, resolution, and frames per second may be measured separately for one or more of audio samples, video samples, and screen sharing samples.

The multimedia processing control API 576 may forward received default A/V processing instruction module settings and various sensor readings to the intelligent contextual virtual background management system 570 for determination of optimized adjustments to these settings using the neural network described herein. As described in greater detail with respect to FIG. 7, a neural network of the intelligent contextual virtual background management system 570 may be trained based on the neural network input values gathered via the multimedia processing control API 576, as described directly above or according to embodiments described herein. Upon training of such a neural network, the neural network may be ready to determine optimized settings for the information handling system 500, based on updated input values for a videoconferencing using the MMCA 550. In some embodiments, this determination may be made by the neural network operating at the intelligent contextual virtual background management system 570, located remotely from the information handling system 500. In other embodiments, the trained neural network for information handling system 500 may be transmitted from the intelligent contextual virtual background management system 570 to an agent 571 thereof, operating at the information handling system 500.

The process described directly above for gathering inputs into the neural network (e.g., via the multimedia processing control API 576), and transmission of those inputs to the intelligent contextual virtual background management system 570 in an embodiment may be repeated, following training of the neural network. As described in greater detail with respect to FIG. 8, the neural network in an embodiment may determine optimized virtual background selection instructions, optimized boundary detection algorithm selection instructions, or optimized offload settings. Each of the optimized settings or instructions output from the neural network may be transmitted to the multimedia processing control API 576 in an embodiment.

The multimedia processing control API 576 in an embodiment may transmit each of the optimized instructions received from the intelligent contextual virtual background management system 570 neural network to the streaming media driver 525 or to the multimedia framework pipeline and infrastructure platform 540. For example, the multimedia processing control API 576 may transmit the optimized virtual background selection instruction, optimized boundary detection algorithm selection instruction, or optimized offload instructions to the multimedia framework pipeline and infrastructure platform 540. As described herein, the multimedia framework pipeline and infrastructure platform 540 may perform post-capture processing of media samples (e.g., video samples and audio samples). The multimedia framework pipeline and infrastructure platform 540 in an embodiment may include an A/V processing instruction manager 541 directing the video processing engine 580 or audio processing engine 590 to perform various post-capture media processing methods (e.g., according to the optimized virtual background selection instruction or optimized boundary detection algorithm selection instruction) via a processor identified within the optimized offload instruction on captured media samples. Through determination and delivery of each of these optimized instructions to the information handling system 500, the intelligent contextual virtual background management system 570 in an embodiment may optimize post-capture processing of media samples to balance CPU load (and other processor loads) of the information handling system 500 with quality of user experience when engaged in a user session for the MMCA 540, based on organizational rankings of each of the participants within the videoconference user session.

Figure 6:
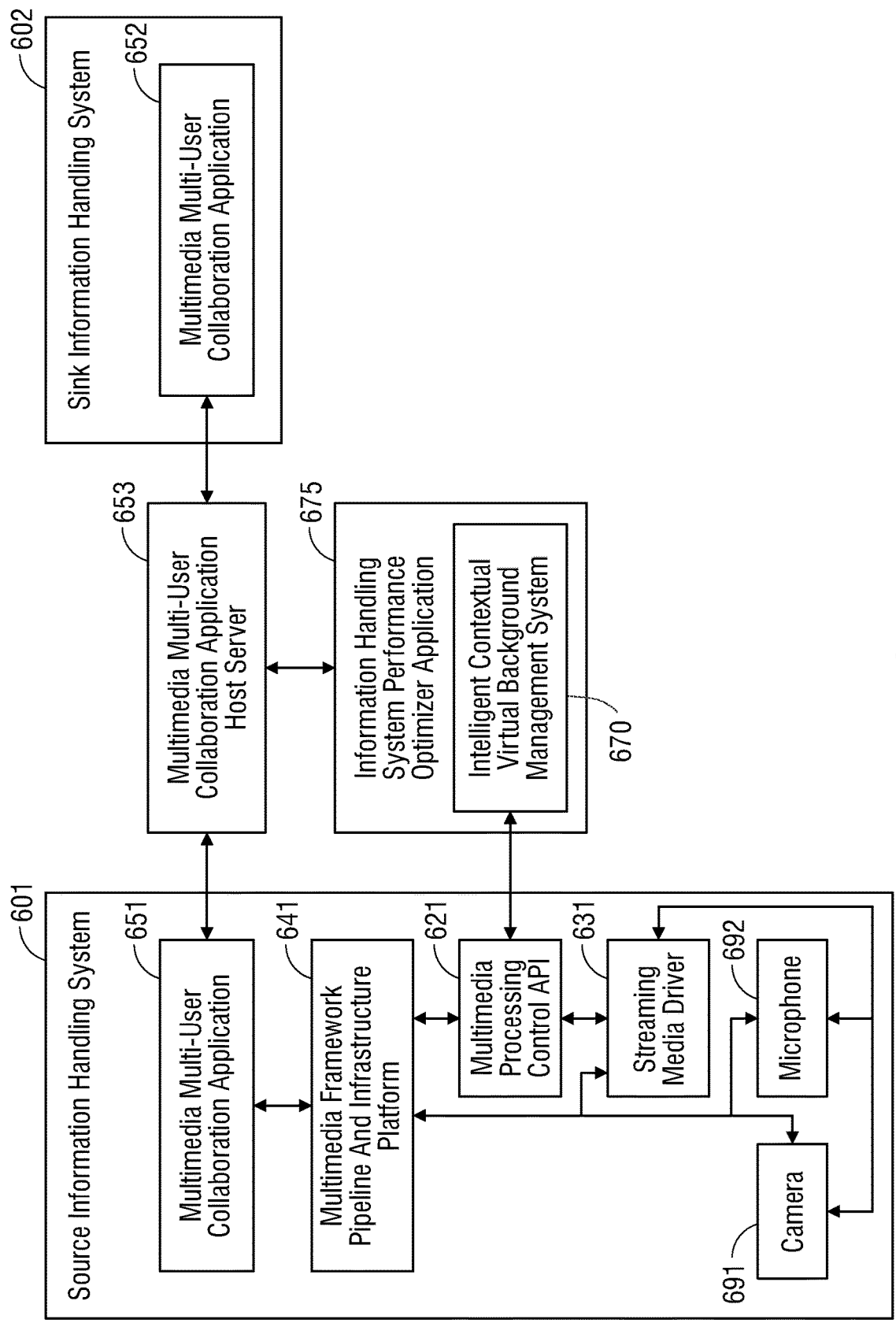
FIG. 6 is a block diagram illustrating a second embodiment of an intelligent contextual virtual background management system for optimizing information handling system operation of an MMCA according to an embodiment of the present disclosure.

FIG. 6 is a block diagram illustrating a second embodiment of an intelligent contextual virtual background management system for coordinating processing of media samples across a plurality of information handling systems that are each participating in the same user session of a multimedia multi-user collaboration application (MMCA) according to an embodiment of the present disclosure. User sessions may be hosted and coordinated by a MMCA host server 653 located remotely from, but in communication with one or more source information handling systems (e.g., 601) and one or more sink information handling systems (e.g., 602) via a network.

As described herein, the intelligent contextual virtual background management system 670 may optimize the boundary detection algorithm used to define the boundary of a user of the source information handling system 601 within a captured video sample, optimize a virtual background applied around the detected boundary of the user, and optimize an offload instruction directing alternate processors (e.g., GPU, VPU, or GNA) to execute such methods. The intelligent contextual virtual background management system in an embodiment may perform these optimizations in order to optimize performance of the MMCA at the source information handling systems (e.g., 601) capturing the video sample and to optimize presentation of the processed video sample at each of a plurality of sink information handling systems (e.g., 602), based on organizational ranking of the user of the source information handling system 601 relative to the organizational rankings of the users of the sink information handling systems (e.g., 602), during a user session hosted by the MMCA host server 653. By optimizing processing of such media samples shared across a plurality of information handling systems (e.g., 601 and 602) engaged in the same user session, the intelligent contextual virtual background management system 670 in an embodiment may balance the processing power consumed during such application of such processing methods with the quality of the video sample containing the virtual background, based on the level of professionalism that is appropriate given the various organizational rankings of the videoconference participants. It is understood that information handling system 601 and information handling system 602, as well as any other information handling systems participating within the user session hosted by the MMCA host server 653 may operate as a media source, a media sink, or both.

The intelligent contextual virtual background management system 670, or separate agents thereof operating at the source information handling system 601 and sink information handling system 602, respectively, may make these determinations based on metrics specific to a single user session for the MMCA in which both the source information handling system 601 and the sink information handling system 602 are engaged. The MMCA 651 and MMCA 652 in an embodiment may operate through a shared network via a MMCA host server 653 to control engagement in videoconference systems.

The MMCA host server 653 in an embodiment may comprise a plurality of servers executing software for recording metrics for each hosted user session. Such recorded user session metrics in an embodiment may describe, for example, the identities of participants in the user session, features of the MMCA that are enabled for each participant, or the like. The additional user session metrics for a session in which the source information handling system 601 or sink information handling 602 participate may be gathered by the MMCA host server 653, and transmitted to the MMCA 651 and MMCA 652 for input into the neural network of the intelligent contextual virtual background management system 670 in some embodiments. For example, the source information handling system 601 may execute a first neural network trained by the intelligent contextual virtual background management system 670, based on inputs previously gathered at the source information handling system 601 (e.g., as described with reference to FIGS. 2 and 5) to make such a determination.

As described herein, for example in an embodiment described with reference to FIG. 5, the intelligent contextual virtual background management system 670 may transmit optimized settings or instructions to the multimedia processing control API 621, based on outputs from the trained neural networks for information handling system 601. In an embodiment shown in FIG. 6, in which the intelligent contextual virtual background management system 670 operates within the information handling system performance optimizer application 675, remotely from either the source information handling system 601 or the sink information handling system 602, the intelligent contextual virtual background management system 670 may determine such optimized settings or instructions for the source information handling system 601 using a first neural network trained specifically based on neural network input values previously received from the source information handling system 601, or from other information handling systems (e.g., 602) in a crowd-source approach. The intelligent contextual virtual background management system 670 in such an embodiment may transmit the optimized settings or instructions output by this neural network to the multimedia processing control API 621, for example. In other example embodiments, the multimedia processing control API 621 may receive such optimized settings or instructions output by such a neural network operating at the source information handling system 601.

Optimized settings or instructions output by such a neural network and transmitted to the multimedia processing control API 621 of the source information handling system 601 in an embodiment may include, for example, optimized virtual background selection instructions, optimized boundary detection algorithm selection instructions, or optimized offload instructions. The intelligent contextual virtual background management system 670 in an embodiment may transmit one or more of these optimized virtual background selection instruction, optimized boundary detection algorithm selection instructions, or optimized offload instructions to the multimedia framework pipeline and infrastructure platform 641.

The streaming media driver 631 in an embodiment may direct the camera 691 to capture video samples of the user of information handling system 601 and direct the microphone 692 to capture audio samples of the user of information handling system 601. As another example embodiment, the streaming media driver 631 in an embodiment may select one of a plurality of cameras (e.g., camera 691) to capture images and generate video samples, based on the camera selection instructions.

As described in greater detail with reference to FIGS. 3-4, the A/V processing instruction manager of the multimedia framework pipeline and infrastructure platform 641 in an embodiment may execute one or more A/V processing instruction modules on video samples received from the camera 691 via the streaming media driver 631, and audio samples received from the microphone 692 via the streaming media driver 631. The algorithms or methods employed during execution of each of these A/V processing instruction modules, and the processor executing such algorithms may be chosen based on the optimized offload settings, optimized virtual background selection instructions, or optimized boundary detection algorithm selection instructions in an embodiment. For example, optimized virtual background selection instructions in an embodiment may identify a specific background that requires lower computing overhead to apply during a videoconference involving participants having organizational rankings equivalent to or lesser than the user of the information handling system 601. As another example, optimized virtual background selection instructions in an embodiment may identify a specific background that requires higher computing overhead to apply, but result in a more polished presentation during a videoconference involving participants having organizational rankings above that of the user of the information handling system 601.

In yet another example, optimized boundary detection algorithm selection instructions in an embodiment may identify a less complex algorithm (e.g., image segmentation) that requires lower computing overhead to apply during a videoconference involving participants having organizational rankings equivalent to or lesser than the user of the information handling system 601. As another example, optimized boundary detection algorithm selection instructions in an embodiment may identify a more complex algorithm (e.g., image matting) that requires higher computing overhead to apply, but result in a more polished presentation during a videoconference involving participants having organizational rankings above that of the user of the information handling system 601.

As described with respect to FIG. 4, the load on the CPU of the source information handling system 601 in an embodiment may be decreased by directing the A/V processing instruction manager of the multimedia framework pipeline and infrastructure platform 641 to engage processors (e.g., GPU, VPU, GNA) other than the CPU of the source information handling system 601 to execute various A/V processing instruction modules. In such a way, the intelligent contextual virtual background management system 670 may decrease the load on the CPU at the source information handling system 601 through a variety of methods. This may free up processing power for execution of other software applications (e.g., other than the MMCA 651) during a user session for the MMCA 651, and result in greater overall user experience.

Figure 7:
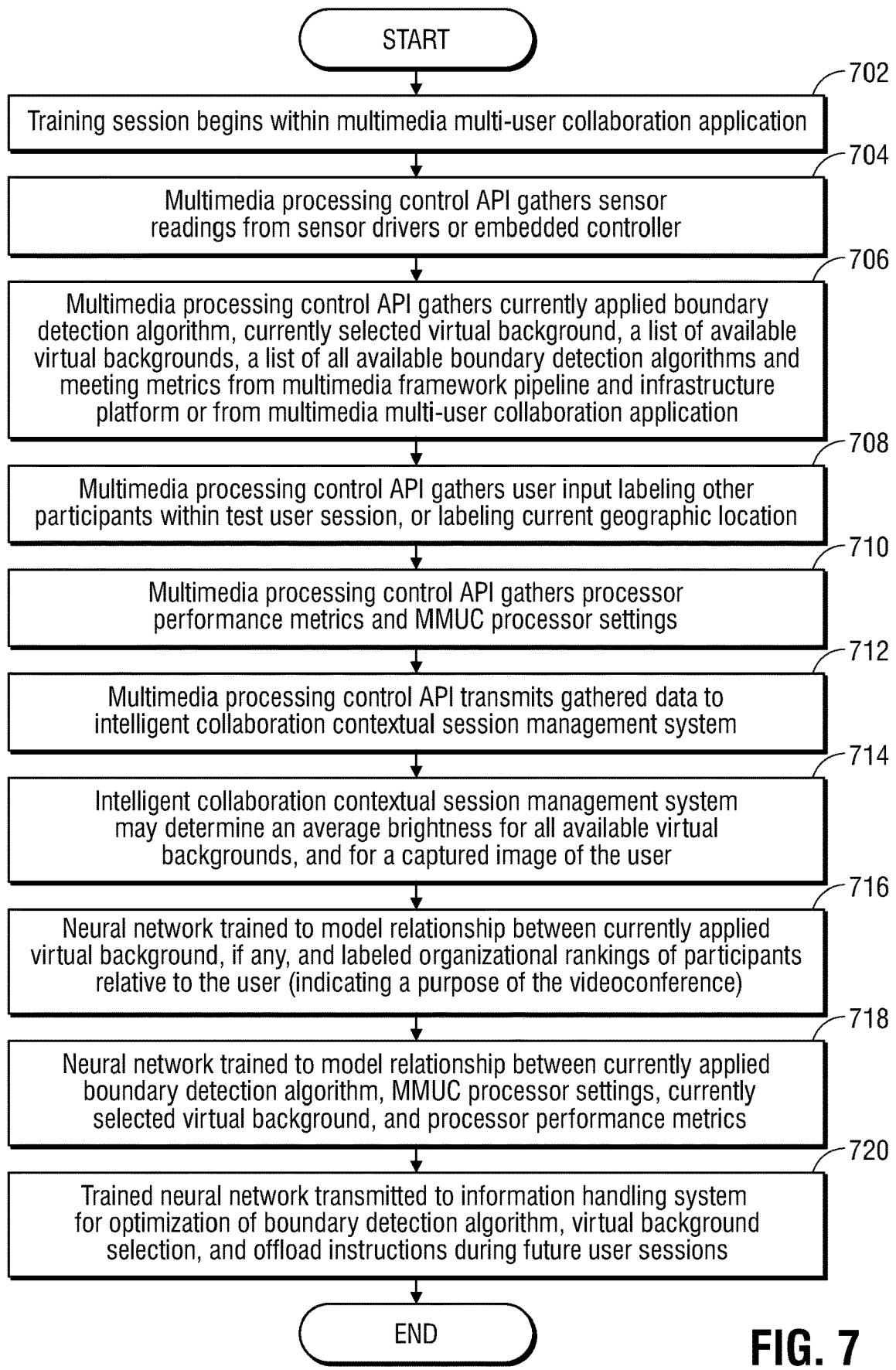
FIG. 7 is a flow diagram illustrating a method of training a neural network to model a relationship between various inputs, virtual background selections, and MMCA processor settings according to an embodiment of the present disclosure.

FIG. 7 is a flow diagram illustrating a method of training a neural network to model a relationship between participant organizational rankings, multimedia multi-user collaboration application (MMCA) consumption of processor resources, various other inputs, virtual background selections, and MMCA processor settings according to an embodiment of the present disclosure. The intelligent contextual virtual background management system in an embodiment may gather input variables, such processing or system capabilities, current or default virtual backgrounds applied, current or default boundary detection algorithms used, current or default offload instructions, user-labeled geographic location of the information handling system (e.g., at a location labeled by the user as private, such as a master bedroom), user-labeled organizational position or rank of videoconference call participants (executive, customer, working team, friends, family, etc.), or average brightness of an image of the user of the information handling system. These input variables may be gathered for a plurality of training sessions in which a single information handling system participates, in order to tailor the neural network to optimize CPU usage, and to tailor selection of a virtual background appropriate for a professional appearance of captured and processed media samples in an embodiment. In another embodiment, these input variables may be gathered for a plurality of training session across a plurality of information handling systems in order to leverage crowd-sourced data. The intelligent contextual virtual background management system may execute separate neural networks in some embodiments to separately assess selection of professional appearing virtual backgrounds via one neural network, and to tailor CPU usage for virtual background algorithm selections, such as boundary detection algorithm selection or CPU offloading, with another neural network.

By comparing different virtual backgrounds applied, boundary detection algorithms used, processors directed to execute such methods, organizational rankings of participants of training sessions, brightness of images captured by the information handling system, brightness of the virtual background applied, and user-labeled geographic location of the information handling system during such training sessions, or user-labels of organizational hierarchy for videoconference participants, the neural network or networks trained herein may learn relationships between one or more of these input values and one or more potential output instructions, including an optimized virtual background selection instruction, and optimized MMCA processor utilization instructions which may include an optimized boundary detection algorithm selection instruction, and an optimized offload instruction.

At block 702, a training user session may begin within the MMCA in an embodiment. For example, in an embodiment described with reference to FIG. 6, a source information handling system 601 and a sink information handling system 602 may both join a single user session for the MMCA (e.g., 651 and 652) via a central, networked MMCA host server 653, an agent of which may be operating at both the source information handling system 601 and the sink information handling system 602. It is understood that each information handling system 601 and 602 may function as a media source and as a media sink. A training user session may be differentiated from other user sessions in an embodiment in that applications, drivers, or firmware other than the intelligent contextual virtual background management system may provide AN processing instruction adjustments, or offload instructions. Only after such training user sessions have been completed may the intelligent contextual virtual background management system in an embodiment generate optimized virtual background selection instructions, optimized boundary detection algorithm selection instructions, or optimized offload instructions. A plurality of training user sessions may be completed in an embodiment prior to conclusion of the training phase for the neural network of the intelligent contextual virtual background management system.

The multimedia processing control API may gather sensor readings from sensor drivers at block 704 in an embodiment. For example, in an embodiment described with reference to FIG. 2, various sensor readings may be taken by the information handling system 200 and communicated to the intelligent contextual virtual background management system. More specifically, the information handling system 200 may include one or more sensors within a sensor array 230 as described in various embodiments herein. All sensor readings from sensors within the sensor array 230 in an embodiment may be transmitted to the sensor drivers 231. This sensor information in an embodiment may include information used to determine the level of participation of a user in a videoconference user session. For example, a light detector in an embodiment may detect an average ambient light brightness surrounding the information handling system, or a GPS sensor may identify a geographic location of the information handling system 200. In another aspect of an embodiment, the camera 220 may capture an image of the information handling system user and transmit the captured image to the multimedia processing control API 274 via the streaming media driver 225. Brightness of that captured image may indicate ambient light brightness in such an embodiment. In another embodiment described with reference to FIG. 5, the multimedia processing control API 574 may forward various sensor readings to the intelligent contextual virtual background management system 570 for determination of optimized instruction using the neural network described herein.

In another example embodiment described with reference to FIG. 2, a GPS module may determine GPS coordinates, or an antenna front end system of the network interface device may operate as one of the sensors in the array 230 to location based on connection to one or more Wi-Fi networks or cellular networks. The GPS coordinates or other location identification of the information handling system 200 and identification of one or more Wi-Fi networks or cellular networks to which the information handling system 200 connects may constitute sensor readings gathered at the sensor drivers 231 in an embodiment. All sensor readings from sensors within the sensor array 230 in an embodiment may be transmitted to the sensor drivers 231. These sensor readings may be transmitted from the sensor drivers 231 to the neural network of the intelligent contextual virtual background management system via the processor 210 and a multimedia processing controller API 276.

The multimedia processing control API in an embodiment may gather currently applied boundary detection algorithms, virtual backgrounds currently selected, and various meeting metrics from the multimedia framework pipeline and infrastructure platform or from the MMCA at block 706. For example, in an embodiment described with reference to FIG. 2, currently applied or default offload instructions (e.g., identifying a processor assigned to execute the virtual background module or boundary detection module), currently applied or default boundary detection algorithms and virtual background selections, and a list of all available boundary detection algorithms and virtual backgrounds may be gathered via the streaming media driver 225 and transmitted to the intelligent contextual virtual background management system. In another aspect of an embodiment, the streaming media driver 225 may gather an image for each of the available virtual backgrounds or labels and metadata identifying the types of available virtual backgrounds. In another example embodiment described with reference to FIG. 5, the multimedia processing control API 576 may receive currently applied or default boundary detection algorithms and virtual background selections via direct communication with the multimedia framework pipeline and infrastructure platform 540, or the MMCA 550.

As an example of gathering meeting metrics, the intelligent contextual virtual background management system 570 may be in communication with the MMCA 550 executing the training user session at the information handling system 500. In another embodiment, described with reference to FIG. 6, the intelligent contextual virtual background management system 670 may receive meeting metrics from the MMCA host server 653 that hosts the training session. The intelligent contextual virtual background management system 670 may receive one or more meeting metrics describing performance of the MMCA during execution of such a training user session in an embodiment. Examples of meeting metrics may include indication data of whether virtual backgrounds have been enabled and which virtual backgrounds are available to be enabled. Other meeting metrics may include number of videoconference call participants in some embodiments. Yet other meeting metrics may further include indications of sharing of documents or other resources during the videoconference call. Meeting metrics may also provide data of indications relating to other features enabled or utilized on the MMCA. Meeting metrics may also indicate performance of the information handling system or the executing software system of the MMCA during its operation in some embodiments. Such meeting metrics may include, for example, a measure of the CPU, GPU, and other processing resources consumed by the MMCA over time, during the training user session. Yet other example meeting metrics may identify participants of the user session according to self-identified labels, email addresses of invited participants, social media information about participants, or other factors.

Such meeting metrics may also describe the performance of media sample processing, transmission, and playback among a plurality of information handling systems engaged in a single user session for the MMCA. For example, meeting metrics gathered by the intelligent contextual virtual background management system during a training session may describe latency, or a measurement of time elapsing between a first information handling system transmitting the processed, encoded media sample and a second information handling system receiving the processed, encoded media sample. As another example, meeting metrics may include a measurement of jitter, or a comparison between latency of playback for a media sample from one of the meeting participants, and latency of playback for another media sample from another of the meeting participants. Such jitter may cause the two separate media samples, which may have been recorded simultaneously, to playback such that they are out-of-sync with one another. Still other meeting metrics in an embodiment may measure bandwidth consumed by the MMCA, type of network used to transmit and receive media samples, packet loss (e.g., of video or audio samples), resolution and frames per second of video samples (both at the transmitting side and the receiving side), audio bitrate (both at the transmitting side and the receiving side), and one or more codecs or compression algorithms in use. In some embodiments, jitter, packet loss, latency, resolution, and frames per second may be measured separately for one or more of audio samples, video samples, and screen sharing samples. In still other examples, meeting metrics may be gathered by the MMCA host server 653, and may describe the number of users, which users are screen-sharing, which users are using virtual backgrounds, which users are muted, and which participants are hosting, among other descriptions of participation among a plurality of users in a single videoconference session.

At block 708, the multimedia processing control API may gather user input labeling other participants or other data such as emails of invited participants as compared with an organizational chart or contacts list within the test user session, or labeling current geographic location. Information identifying participants within a training user session, as gathered at block 706, may indicate a username, e-mail, employee ID, or other identifying information for a participant within the training user session. Users of the information handling system or administrators within a corporate hierarchy may provide further identification, detailing such participants' organizational rank within such a corporate hierarchy, through user input in an embodiment. A user may label one or more participants of a current training user session, past training user sessions, or participants within a contact list by an organizational ranking. For example, a user may label such participants by their role within the business organization, such as engineer, sales representative, executive, vice-president, or chief operating officer. As another example, a user may label such participants by a hierarchical ranking applied by the company in which the user and participant work, such as, data analyst I, data analyst II, and so forth, with increasing roman numerals indicating increasing seniority. In such an example embodiment, these organizational rankings may be applied by an employee of the organization, or by an administrator or IT professional managing profiles for a plurality of organization employees. In such an embodiment, the labeling of participants may occur through communication with the information handling system performance optimizer application 575 that manages a plurality of information handling systems assigned to various employees across an enterprise business.

In some embodiments, users may also provide organizational ranking labels or participant labels may be determined from identifying data for individuals outside the enterprise business or company in which the user is employed. For example, users may label participants or contacts, or identifying data about videoconference participants may determine them as clients, customers, vendors, or very important persons (VIPs) with whom the user maintains a more professional relationship in comparison to say, coworkers of the same organizational rank or with whom the user has daily and more casual contact such as family or friends. In some embodiments, users or an information technology administrator may label such participants to indicate such a professional relationship (e.g., by tagging the participant as a VIP). User input may be provided in an embodiment through user interaction with one or more Graphical User Interfaces (GUIs) or via business or personal associations made on a contacts list, determined from emails, or other sources of identifying data such as social media. For example, a user of the information handling system 500 in an embodiment may provide user input via a GUI of the MMCA 550, the multimedia processing control API 576, the multimedia framework pipeline and infrastructure platform 540, the intelligent contextual virtual background management system 570 (or agent 571 thereof), or the information handling system performance optimizer application 575.

At block 710, the multimedia processing control API may gather hardware performance metrics from an embedded controller in an embodiment. For example, in an embodiment described with reference to FIG. 5, hardware performance metrics describing total processing load at one or more processors may be gathered via an embedded controller 504 in an embodiment, and transmitted to the multimedia processing control API 576. The embedded controller 504 in an embodiment may gather such metrics through direct communication with the processor (e.g., CPU, GPU, VPU, GNA, etc.). In other embodiments, the information handling system performance optimizer application 575 may be in direct communication with the embedded controller 504 via out-of-band communications. In such embodiments, the hardware performance metrics (e.g., CPU load, current MMCA processor setting) may be determined by the embedded controller 504 in kernel mode and communicated to the information handling system performance optimizer application 575 directly during routine out-of-band communications between the information handling system performance optimizer application 575 and all managed information handling systems (e.g., including 500). Other example hardware performance metrics may include a measure of memory resources consumed. Still other example hardware performance metrics may compare CPU or other processors or memory usage by the MMCA to total CPU or other processors or memory used by all applications, hardware, or firmware during the training user session.

The multimedia processing control API in an embodiment may transmit the data gathered at steps 704-710 to the intelligent contextual virtual background management system in an embodiment at block 712. By gathering this data, and transmitting it to the intelligent contextual virtual background management system in an embodiment, the multimedia processing control API may operate as a sensor hub. For example, in an embodiment described with reference to FIG. 5, the multimedia processing control API 574 may forward received default media capture instructions, default A/V processing instruction module settings, captured audio samples, captured video samples, and various sensor readings to the intelligent contextual virtual background management system 570 for determination of optimized settings using the neural network described herein. A neural network of the intelligent contextual virtual background management system 570 may be separately trained for each information handling system (e.g., including 500) in communication with or managed by the information handling system performance optimizer application 575 in an embodiment. Such a training session may be performed based on the neural network input values gathered via the multimedia processing control API 576, as described with respect to FIG. 7 at blocks 704, 706, 708, and 710. Upon training of such a neural network unique to each information handling system (e.g., 500), the neural network may be ready to determine optimized settings for the information handling system for which it was trained (e.g., as described in greater detail with respect to block 716), based on updated input values.

At block 714, the intelligent contextual virtual background management system in an embodiment may determine an average brightness for all available virtual backgrounds, and for a captured image of the user. Such an image of the user may be captured, for example, as described above with reference to FIG. 704. As described above with reference to block 706, the intelligent contextual virtual background management system may receive a list of all available virtual backgrounds, as well as images of each of those virtual backgrounds. For each virtual background available for selection by a user of the MMCA in an embodiment, the intelligent contextual virtual background management system may calculate an average brightness. It is contemplated such a determination or calculation may be performed in a variety of ways. For example, the image for a given virtual background may be converted to grayscale, and an average pixel brightness across the grayscale image may be calculated by taking the mean grayscale value across all pixels. In another example, the root mean square may be taken across all pixel values for the grayscale image. Still other examples contemplate taking the statistical mean or root mean square across all red, green, blue (RGB) values of the original image (e.g., prior to converting to grayscale). Any statistical method for gauging an average or mean value of brightness across an image may be used in an embodiment, so long as the statistical method for determining such brightness of the virtual background image is also applied to determine the average brightness of an image of the user as captured by the information handling system and gathered at block 704.

The intelligent contextual virtual background management system in an embodiment may be trained at block 716 to model a relationship between a currently applied virtual background, if any, labeled organizational rankings of participants relative to the user, current lighting conditions, and current geographic location of the information handling system. As an example of learning the relationship between these various inputs and the currently selected virtual background, if the current geographic location of the information handling system has been labeled by the user as private, and the user always applies a virtual background to mask the background image of the private location (e.g., a master bedroom), the neural network may learn a strong correlation between geographic locations labeled as private and the need to apply a virtual background. As another example, if a user consistently selects virtual backgrounds having an average brightness that differs from the average ambient brightness of the user in a captured image in order to provide a good contrast between the user and the applied virtual background, the neural network may learn to select virtual backgrounds that will provide greater contrast.

As yet another example, if a user consistently selects a higher quality or more complex boundary detection algorithm when the average ambient brightness is low, (e.g., because lower quality or less complex boundary detection algorithms do not adequately determine the boundary of the user in low-light conditions), the neural network may learn a strong correlation between low ambient brightness and more complex boundary detection algorithms. In another example, the neural network may be trained to determine that selection of a type of virtual background to be used may be linked to the organization ranking of videoconference call participants. For example, identification of a customer or client on a call or a high-level executive may yield selection of one professional-looking virtual background where a video conference with a working team, friends, or family may yield different, less formal virtual backgrounds to be selected. Thus, the neural network may be trained to select types of virtual backgrounds based on organizational rankings of all participants involved.

As described with reference to block 708, the user may have provided labels for one or more participants indicating the user's relationship with those participants is more professional than casual in an embodiment. In other embodiments, context of invited email addresses, company-wide or personal contact list designations, social media indications or other data about videoconference call participants may indicate a user's relationship with those participants. In still other embodiments, contents of the virtual background currently applied may indicate whether the user perceives the current training session as professional. For example, a separate neural network may be trained to recognize the logo for the user's employer within the virtual background, and apply an indication in metadata for the virtual background indicating this. The user may wish to prioritize the quality of videos of the user with use of greater processing resources as well as selection of professional virtual backgrounds during videoconferences with such participants, in order to present a more professional and polished image. In contrast, during videoconferences with employees having equal or lower ranking, or participants with whom the user maintains a more casual relationship (e.g., family members, friends, etc.), the user may wish to utilize a less formal virtual background.

The intelligent contextual virtual background management system may input each of the values gathered from the multimedia processing control API and the MMCA into a multi-layered, feed-forward, machine-learning neural network to train the neural network to model the relationship between the user-labeled or otherwise determined organizational rankings of one or more participants of the training user session videoconference indicating a purpose of the videoconference, the virtual background selected, ambient lighting, and geographic locations. For example, the neural network may be trained to identify a specific virtual background routinely used during such training sessions in which the user is presenting (e.g., indicating a professional atmosphere), sessions in which a participant has been labeled (e.g., by the user or by reference to organizational charts or titles identified in e-mail, enterprise profiles, or social media) as important with respect to the user, sessions in which the user has labeled the participant with a familial, friendly, or casual designation (e.g., friend from outside work, brother, mother, in-laws, etc.), sessions in which the user is in low ambient lighting, or sessions in geographic locations specifically labeled as private. As another example, if the current geographic location of the information handling system has been labeled by the user as private, and the user always applies a virtual background to mask the background image of the master bedroom, the neural network may learn a strong correlation between geographic locations labeled as private and the need to apply a virtual background. As yet another example, if a user consistently selects virtual backgrounds having an average brightness that differs from the average ambient brightness of the user in a captured image in order to provide a good contrast between the user and the applied virtual background, the neural network may learn to enable a virtual background in such lighting conditions and to select virtual backgrounds that will provide greater contrast.

At block 716, the intelligent contextual virtual background management system in an embodiment may train the neural network to also model the relationship between a currently applied boundary detection algorithm, MMCA processor settings, a currently selected virtual background, and processor performance metrics. For example, the neural network may be trained to detect a correlation between more complex boundary detection algorithms (e.g., image matting algorithms), virtual backgrounds that are animated or have a high resolution, and MMCA processor settings that instruct a single processor to execute all or a majority of MMCA modules (e.g., virtual background module or boundary detection module) with relatively higher rates at which the MMCA consumes processor resources. In contrast, the neural network may be trained to detect a correlation between less complex boundary detection algorithms (e.g., image segmentation algorithms), virtual background having lower resolutions, and MMCA processor settings distributing execution of the MMCA modules across a plurality of processors with relatively lower rates at which the MMCA consumes resources of any single processor.

The intelligent contextual virtual background management system may input each of the values gathered from the multimedia processing control API and the MMCA into the multi-layered, feed-forward, machine-learning neural network to train the neural network to also model the relationship between a currently applied boundary detection algorithm, MMCA processor settings, a currently selected virtual background, and processor performance metrics. The intelligent contextual virtual background management system in an embodiment may model a multi-layered, feed-forward, machine-learning classifier neural network in an embodiment, for example, as a deep-learning 4 (DL4) neural network. More specifically, the neural network in an embodiment may comprise a multi-layer perceptron (MLP) classifier neural network. Several such multi-layered feed-forward, machine-learning classifier neural networks exist in the art, and any of these networks may be chosen to model this relationship between the user-labeled or otherwise determined organizational rankings of one or more participants of the training user session videoconference indicating a purpose of the videoconference, the virtual background selected, ambient lighting, and geographic locations, or between a currently applied boundary detection algorithm, MMCA processor settings, a currently selected virtual background, and processor performance metrics. For example, the DL4 neural network may operate in a Java programming language (e.g., DL4J), or within the Scala programming language (e.g., DL4S). Other deep-learning neural networks may be modeled using Apache® Maven®, for example. In still other embodiments, the DL4 neural network may be modeled using a plurality of classifiers, including a linear MLP classifier, a Moon MLP classifier, or a Saturn MLP classifier. Each of these types of MLP classifiers in an embodiment may define a different activation function that operates to define a relationship between separate layers of the neural network.

The neural network may include a plurality of layers, including an input layer, one or more hidden layers, and an output layer. The currently applied MMCA processor settings for execution of the virtual background module or the boundary detection module, currently applied boundary detection algorithm, currently selected virtual background, a list of available virtual backgrounds, a list of all available boundary detection algorithms, user-applied labels for organizational rankings of one or more participants, user-applied labels for current geographic location, processor performance metrics, average brightness for all available virtual backgrounds, an average brightness for a captured image of the user, and meeting metrics gathered at blocks 704, 706, 708, 710, and 714 may form the input layer of the neural network in an embodiment. These input layers may be forward propagated through the neural network to produce an initial output layer that includes predicted CPU resource load attributable to execution of the MMCA, predicted virtual background selection, predicted boundary detection algorithm applied, and predicted offload settings.

The intelligent contextual virtual background management system may have received known values for the offload instructions, virtual background selected, and boundary detection algorithm used at block 712. Output nodes representing predicted values for these variables within the output layer in an embodiment may be compared against such known values to generate an error function for each of the output nodes. For example, if the predicted virtual background selected, as determined in the output layer of the first neural network matches the known virtual background selected, the error function may have a value of zero, and the error function may have a value of one if the predicted and known virtual background selections do not match one another. As another example, if the predicted boundary detection algorithm used, as determined in the output layer of the first neural network matches the known boundary detection algorithm used, the error function may have a value of zero, and the error function may have a value of one if the predicted and known boundary detection algorithms applied do not match one another. In yet another example, if the predicted boundary detection algorithm, as determined in the output layer of the first neural network matches the known boundary detection algorithm used, the error function may have a value of zero, and the error function may have a value of one if the predicted and known boundary detection algorithms applied do not match one another. Offload instructions may be considered as matching in embodiments described herein if they instruct the same processors (e.g., CPU, GPU, VPU, or GNA) to perform the application of the virtual background or execution of the boundary detection algorithm as identified in the current MMCA processor settings. Such offload instructions need not, however, specifically identify the specific virtual background so applied or the specific boundary detection algorithm so executed.

This error function may then be back propagated through the neural network to adjust the weights of each layer of the neural network. The accuracy of the predicted meeting metric values (as represented by the output nodes) may be optimized in an embodiment by minimizing the error functions associated with each of the output nodes. Such forward propagation and backward propagation may be repeated serially during training of the neural network, adjusting the error function during each repetition, until the error function for all of the output nodes associated with known values falls below a preset threshold value. In other words, the weights of the layers of the neural network may be serially adjusted until the output node for the predicted offload instructions, predicted virtual background selected, and predicted boundary detection algorithm applied accurately predict the known values received at blocks 712. It is contemplated that the values for output nodes not associated with known values, such as the CPU resources consumed by the MMCA may vary as the weight matrices are adjusted. In such a way, the neural network may be trained to provide the most accurate output layer, including a prediction of the offload instruction issued, virtual background that will be selected and the boundary detection algorithm that will be applied during videoconferences that include participants having higher organizational ranking than the user.

Such a training of the neural network in an embodiment based on known values received at blocks 712 during a user session of the MMCA may comprise a single training session. Such a training session in an embodiment may be repeated for several user sessions. Various MMCA processor settings, virtual backgrounds and boundary detection algorithms may be applied, and in varying combinations with respect to one another, during these several user sessions. In such a way, the neural network may be trained to predict performance of the MMCA (e.g., as measured by meeting metrics) in a plurality of varying conditions, as described by various combinations of virtual backgrounds selected, boundary detection algorithms applied, and MMCA processor settings applied.

At block 720, the intelligent contextual virtual background management system in an embodiment may transmit the trained neural network to the information handling system for optimization of the quality of virtual background applied and boundary detection algorithm used at that information handling system during future user sessions in which one or more participants has a higher organizational ranking than the user of the information handling system. For example, in an embodiment described with respect to FIG. 5, upon training of the neural network, the neural network may be ready to determine optimized settings for the information handling system 500, based on updated input values. In some embodiments, this determination may be made by the neural networks operating at the intelligent contextual virtual background management system 570, located remotely from the information handling system 500. In other embodiments, the trained neural networks may be transmitted from the intelligent contextual virtual background management system 570 to an agent 571 thereof, operating at the information handling system 500. The method for training the neural network in an embodiment may then end.

Figure 8:
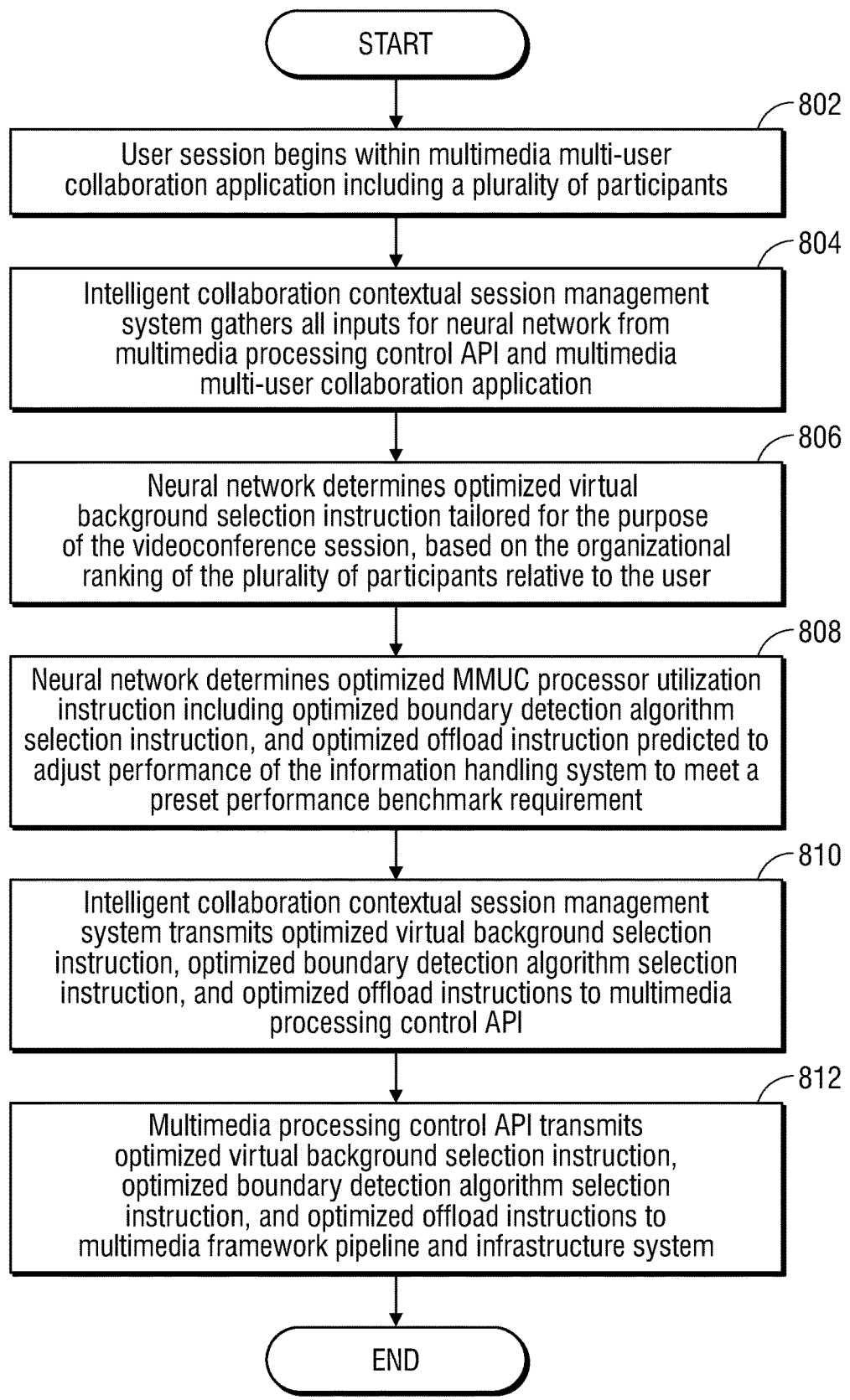
FIG. 8 is a flow diagram illustrating a method of a trained neural network determining optimized virtual background selection instructions, or optimized MMCA processor utilization instructions according to an embodiment of the present disclosure.

FIG. 8 is a flow diagram illustrating a method of a trained neural network determining optimized virtual background selection instructions, or optimized multimedia multi-user collaboration application (MMCA) processor utilization instructions for optimization of performance of the MMCA during execution of a user session according to an embodiment of the present disclosure. As described in greater detail with respect to FIG. 7, a neural network may be trained to determine optimized virtual background selection instructions tailored to the purpose for the videoconference call, optimized MMCA processor utilization instructions, or a combination of these that is most likely to optimize performance of the processors executing code instructions of the MMCA. Feeding input values gathered during a post-training user session into such a trained neural network in an embodiment may produce optimized virtual background selection instructions tailored to the purpose for the videoconference call, optimized MMCA processor utilization instructions, or a combination of these that is most likely to optimize performance of the processors executing code instructions of the MMCA during execution of that later-joined user session at the information handling system.

At block 802, a plurality of information handling systems may join a user videoconference session within the MMCA in an embodiment. For example, in an embodiment described with reference to FIG. 6, a source information handling system 601 and a sink information handling system 602 may both join a videoconference user session via the MMCA host server 653. In some embodiments, the user session begun at block 802 may be joined by any number of information handling systems greater than one.

The intelligent contextual virtual background management system in an embodiment may gather all the inputs for the neural network from the multimedia processing control API and MMCA at block 804. For example, the intelligent contextual virtual background management system in an embodiment may repeat the method described with reference to blocks 704, 706, 708, 710, and 714 in an embodiment in order to gather a currently applied boundary detection algorithm, a currently selected virtual background, a list of available virtual backgrounds, a list of all available boundary detection algorithms, meeting metrics describing participants in the videoconference and MMCA processor resource consumption, user input labeling other participants, labels for the current geographic location, processor performance metrics, MMCA processor settings, an average brightness of a captured image of the user, and average brightness for all available virtual backgrounds.

The values gathered at block 804 in an embodiment may include meeting metrics recorded by the MMCA host server, or agents thereof operating at each of the participating information handling systems. For example, in an embodiment described with reference to FIG. 6, the MMCA host server 653 may record meeting metrics for the user session joined by the plurality of information handling systems at block 802. These metrics may include an identification of all information handling systems (e.g., 601 and 602) participating in the current videoconference user session.

At block 806, the neural network may determine an optimized virtual background selection instruction tailored for the purpose of the videoconference session, based on the organizational ranking of the plurality of participants relative to the user. As described herein with reference to FIG. 7, the neural network may be trained to model the relationship between virtual backgrounds selected during training sessions, and the organizational rankings of the plurality of participants relative to the user, from which a purpose of the videoconference session may be inferred, or which may be supplied directly through user input. Following such training, the organizational rank, participant labels, current geographic location, current lighting conditions, or meeting metrics indicating the user is sharing her screen or hosting the videoconference may be input into the trained neural network. For example, an organizational rank relative to a user in various embodiments may be determined form an organizational chart, invited participant emails or titles, social media contexts, or user identified labels such as in a contacts list. The trained neural network may output an optimized virtual background selection instruction that identifies a virtual background that may be formal or casual or may tailor the selection from virtual backgrounds available depending upon the invited participants to the videoconference session. For example, customers or clients invited as participants may be associated with an optimized virtual background selection instruction that identifies a virtual background having an organization logo or promoting a product or service in an embodiment. As another example embodiment, an employer or business linked set of invited participants having an equal or higher organization ranking by title or in an organizational chart may be associated with an optimized virtual background selection instruction that identifies a virtual background having a professional appearance such as an office background or a company logo. Invited participants that indicate a casual setting for the videoconference call, such as family, friends, or co-workers may be associated with optimized virtual background selection instruction that identifies a virtual background that may be more casual in content.

In another example, in an embodiment in which the current geographic location of the information handling system has been labeled by the user as private, the neural network may output an optimized virtual background selection instruction that identifies a virtual background to mask the background image of the area labeled as private. As another example, the neural network may output an optimized virtual background selection instruction identifying a virtual background having an average brightness that differs from the average brightness of a captured image of the user input into the neural network within a preset tolerance (e.g., 5%, 10%, 25%, etc.).

In some embodiments, the optimized virtual background selection instruction output by the neural network may further include instructions for optimizing resources consumed by the MMCA for any single processor during the videoconference user session. For example, the optimized virtual background selection instruction may instruct the MMCA to apply the virtual background tailored for the purpose of the videoconference session (e.g., as described directly above) at a lower resolution than the resolution at which the MMCA may apply that virtual background by default.

The neural network may determine an optimized MMCA processor utilization instruction including an optimized boundary detection algorithm selection instruction, and an optimized offload instruction predicted to adjust performance of the information handling system to meet a preset performance benchmark requirement in an embodiment at block 808. As described herein with respect to FIG. 7, the neural network may also be trained in embodiments to model the relationship between boundary detection algorithms applied and MMCA processor settings (e.g., identifying one of a plurality of available processors for application of the virtual background or boundary detection) applied during the training sessions for the neural network. Following such training, which may coincide with the training described directly above with respect to the virtual background selection, the processor performance metrics, and current MMCA processor settings may be input into the trained neural network.

The trained neural network may output optimized MMCA processor instructions predicted to adjust performance of the information handling system to meet a preset performance benchmark, such as a capped percentage of resources at one of the plurality of processors that may be consumed by the MMCA during the videoconference user session. For example, the MMCA may be consuming 30% of CPU resources at the time this value is gathered at block 804 in an embodiment. The intelligent contextual virtual background management system in such an embodiment may input a capped value of 20%, instead of the actual measured value of 30% in order to indicate a desired performance benchmark that caps CPU resources consumed by the MMCA at 20%. This is only one example of such a capped processing resource value. In other embodiments, the processing cap may apply to other processors (e.g., GPU, VPU, or GNA), or may have a different value (e.g., 10%).

In other embodiments, a separate capped value may be applied to a plurality of processors. For example, the intelligent contextual virtual background management system in an embodiment may input to the neural network a cap of 10% for the CPU, and 20% for the GPU. In still other embodiments, the processing cap may limit the total percentage of all processing power consumed by the MMCA, combined. For example, the intelligent contextual virtual background management system in an embodiment may input a cap into the neural network for the MMCA to consume less than 50% of the processing resources of the CPU, GPU, VPU, and GNA combined. In yet another embodiment, the processing cap may limit the total percentage of processing power consumed at any of the plurality of processors by all applications executing on the information handling system of interest. For example, the intelligent contextual virtual background management system may input into the neural network a cap of 20% total usage for the CPU of the information handling system of interest. By inputting this value into the input layer of the neural network, the intelligent contextual virtual background management system in an embodiment may then output one or more optimized media capture settings, optimized A/V processing instruction adjustments, or optimized offload instructions projected to achieve this performance benchmark.

The optimized MMCA processor instructions may include, in various embodiments, an optimized boundary detection algorithm selection instruction, or an optimized offload instruction identifying a second processor to which some of the MMCA code instructions may be offloaded. For example, an optimized boundary detection algorithm selection instruction may identify a more complex boundary detection algorithm for detecting the edges of the user more accurately, if execution of that boundary detection algorithm will still meet the preset performance benchmark. As another example, an optimized boundary detection algorithm selection instruction may identify a less complex boundary detection algorithm, if execution of the more complex boundary detection algorithm is not predicted to meet the preset performance benchmark. The trained neural network may also adjust the optimized virtual background selection instruction based on the processor performance metrics, and current MMCA processor settings. For example, the optimized virtual background selection instruction may identify the virtual background most often applied by the user for similar purposes during training sessions for the neural network, and instruct the MMCA to apply this optimized virtual background at a lower resolution than would be applied by default.

At block 810, the intelligent contextual virtual background management system trained neural network may transmit the optimized virtual background selection instruction and the optimized MMCA processor utilization instruction to the multimedia processing control API. For example, in an embodiment described with reference to FIG. 5, the intelligent contextual virtual background management system 570 operating at the information handling system performance optimizer application 575 remotely from information handling system 500 may transmit the optimized virtual background selection instruction and the optimized MMCA processor utilization instruction to the multimedia processing control API 576. In another example embodiment, the intelligent contextual virtual background management system agent 571, operating at the information handling system 500, may transmit the optimized virtual background selection instruction and the optimized MMCA processor utilization instruction to the multimedia processing control API 576.

The multimedia processing control API in an embodiment may transmit the optimized virtual background selection instruction and the optimized MMCA processor utilization instruction to the multimedia framework pipeline and infrastructure system at block 812. For example, the multimedia processing control API 576 may transmit the optimized virtual background selection instruction and the optimized MMCA processor utilization instruction to the multimedia framework pipeline and infrastructure platform 540 to direct execution of the audio/visual processing instruction manager 541. The method for determining optimized virtual background selection instructions and optimized MMCA processor utilization instructions may then end.

Figure 9:
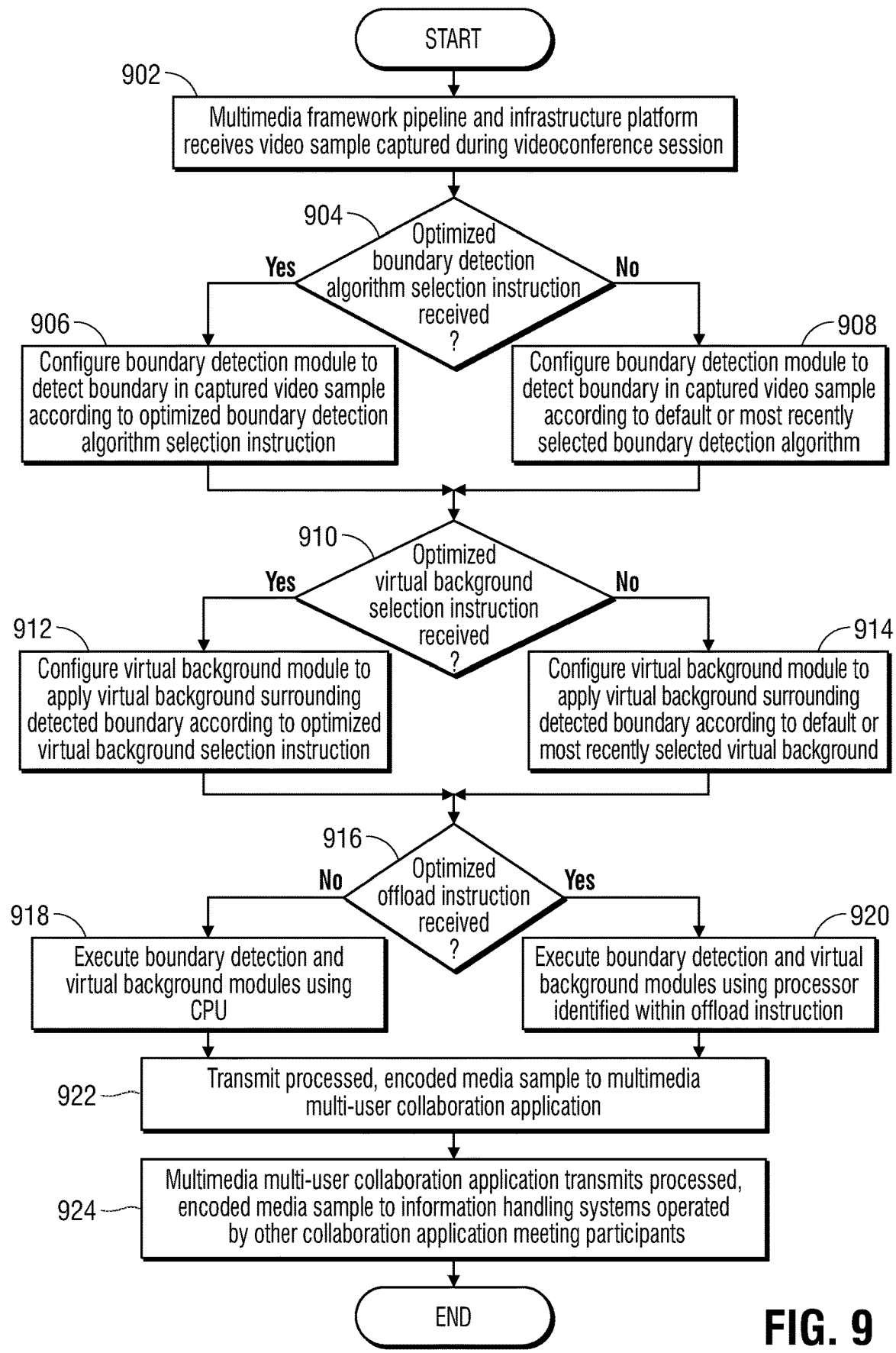
FIG. 9 is a flow diagram illustrating a method of applying optimized virtual background selection instructions and optimized MMCA processor utilization instructions within a videoconference user session according to an embodiment of the present disclosure.

FIG. 9 is a flow diagram illustrating a method of applying optimized virtual background selection instructions and optimized multimedia multi-user collaboration application (MMCA) processor utilization instructions determined by the trained neural network within a videoconference user session to optimize performance of the information handling system executing the MMCA according to an embodiment of the present disclosure. Application of the optimized instructions generated by the trained neural network in an embodiment may adjust methods used to process media samples, as well as balance consumption of processing resources across a plurality of processors, so as to optimize performance of the participating information handling systems during user sessions.

At block 902, the multimedia framework pipeline and infrastructure platform at one of the information handling systems participating in a joint videoconference user session in an embodiment may receive a captured media sample. The captured media sample received at the multimedia framework pipeline and infrastructure platform in an embodiment may be a media sample captured locally at the same information handling system executing the multimedia framework pipeline and infrastructure platform. For example, in an embodiment described with reference to FIG.

6, the camera 691 of the source information handling system 601 may capture a video sample pursuant to optimized video capture instructions, and the microphone 692 may capture the audio sample pursuant to the optimized audio capture instructions.

The captured video sample and audio sample may be transmitted to the A/V processing instruction manager in an embodiment. For example, in an embodiment described with reference to FIG. 4, the streaming media driver 425 (or other drivers) may transmit the captured video and audio samples to the A/V processing instruction manager 441 via a device proxy 442, which may route or map connections between physical pins of the streaming media driver 425 (or other drivers) and the A/V processing instruction manager 441. As another example, in an embodiment described with reference to FIG. 3, the streaming media driver 324 may receive video or audio samples captured by peripheral cameras or microphones in communication therewith, according to the optimized media capture instructions. In another embodiment, the audio driver 329 may receive audio samples captured by a microphone in communication therewith, according to such received optimized media capture instructions. The streaming media driver 325 may transmit video or audio samples received in such a way to the A/V processing instruction manager 341 in an embodiment. In other embodiments, the A/V processing instruction manager 341 may receive an audio sample from the audio driver 329.

The A/V processing instruction manager may determine at block 904 in an embodiment whether an optimized boundary detection algorithm selection instruction has been received. For example, as described above with reference to FIG. 8 at blocks 808, 810 and 812, the neural network in an embodiment may output an optimized boundary detection algorithm selection instruction predicted to adjust performance of the information handling system to meet a preset performance benchmark requirement and transmit that optimized instruction to the A/V processing instruction manager. If the A/V processing instruction manager determines an optimized boundary detection algorithm selection instruction has been received, the method may proceed to block 906, for configuration of the boundary detection module according to the optimized boundary detection algorithm selection instruction. If the A/V processing instruction manager determines an optimized boundary detection algorithm selection instruction has not been received, the method may proceed to block 908, for configuration of the boundary detection module according to the default boundary detection algorithm.

At block 906, in an embodiment in which the A/V processing instruction manager determines an optimized boundary detection algorithm selection instruction has been received, the A/V processing instruction manager may configure the boundary detection module to detect a boundary of the user in the captured video sample according to the optimized boundary detection algorithm selection instruction. As described herein with reference to FIG. 8 at block 808, the neural network may have output an optimized MMCA processor utilization instruction, including an optimized boundary detection algorithm selection instruction that identifies a specific boundary detection algorithm. For example, such an optimized boundary detection algorithm selection instruction may identify a relatively higher complexity image matting algorithm associated with a relatively higher processor resource consumption rate in an embodiment in which the camera is capturing images in low lighting, the organizational rankings of one or more participants indicates a high degree of importance to the user, or the inferred purpose of the videoconference call indicates a professional setting. As another example, such an optimized boundary detection algorithm selection instruction may identify a relatively lower complexity image segmentation algorithm associated with a relatively lower processor resource consumption rate in an embodiment in which the MMCA is consuming an inordinate percentage of available resources for any individual process, the organizational rankings of one or more participants or inferred purpose of the videoconference indicates a casual setting. The method may then proceed to block 910 to determine whether an optimized virtual background selection instruction has been received.

In an embodiment in which the A/V processing instruction manager determines an optimized boundary detection algorithm selection instruction has not been received, the A/V processing instruction manager may configure the boundary detection module to detect a boundary of the user in the captured video sample according to a default or current boundary detection algorithm at block 908. For example, as described with reference to block 706 of FIG. 7, the MMCA may have designated a default or currently applied boundary detection algorithm at the initiation of the current videoconference user session. In an embodiment in which the A/V processing instruction manager determines an optimized boundary detection algorithm selection instruction has not been received, the A/V processing instruction manager may configure the boundary detection module to detect a boundary of the user in the captured video sample according to this currently applied boundary detection algorithm. The method may then proceed to block 910 to determine whether an optimized virtual background selection instruction has been received.

At block 910, the A/V processing instruction manager in an embodiment may determine whether an optimized virtual background selection instruction has been received. For example, as described above with reference to FIG. 8 at block 806, the neural network in an embodiment may output an optimized virtual background selection instruction tailored for the purpose of the videoconference session, based on the organizational ranking of the plurality of participants relative to the user. Further, as described with reference to blocks 810 and 812, that optimized instruction may be transmitted to the A/V processing instruction manager. If the A/V processing instruction manager determines an optimized virtual background selection instruction has been received, the method may proceed to block 912, for configuration of the virtual background module according to the optimized virtual background selection instruction. If the A/V processing instruction manager determines an optimized virtual background selection instruction has not been received, the method may proceed to block 914, for configuration of the virtual background module according to the default virtual background selection.

The A/V processing instruction manager in an embodiment in which an optimized virtual background selection instruction has been received may configure the virtual background module to apply the virtual background surrounding the detected boundary of the user according to the optimized virtual background selection instruction at block 912. As described herein with reference to FIG. 8 at block 806, the neural network may have output an optimized virtual background selection instruction that identifies a specific virtual background tailored to the purpose of the videoconference user session, based on the organizational rankings of the participants. For example, such an optimized virtual background selection instruction may identify a virtual background including the user's company logo or identified in metadata of the virtual background image as professional in an embodiment in which the participants are labeled by the user as important, the participants' organization rankings indicate they are higher ranking than the user, one of the participants is identified as a customer, all of the participants are affiliated with the user's employer, or in which the user is currently hosting the videoconference session or sharing her screen. As another example, such an optimized virtual background selection instruction may identify a virtual background identified in metadata as casual, or routinely used during training sessions involving participants labeled by the user (or through various means including reference to social media accounts and titles) as a friend outside of work, or a family member in an embodiment. In yet another example embodiment, the virtual background module may be configured according to the optimized virtual background selection instruction to apply a specifically identified virtual background (selected as described directly above) at a specific resolution, which may be lower than the default resolution at which the MICA would direct the virtual background module to apply the same virtual background. The method may then proceed to block 916 to determine whether an optimized offload instruction has been received.

At block 914, in an embodiment in which an optimized virtual background selection instruction has not been received, the A/V processing instruction manager may configure the virtual background module to apply the virtual background surrounding the detected boundary of the user according to a default, current, or most recent virtual background selection. For example, as described with reference to block 706 of FIG. 7, the MMCA may have designated a default or currently applied virtual background selection at the initiation of the current videoconference user session. In an embodiment in which the A/V processing instruction manager determines an optimized virtual background selection has not been received, the A/V processing instruction manager may configure the virtual background module to apply a virtual background around the detected boundary of the user in the captured video sample according to this currently applied virtual background selection. The method may then proceed to block 916 to determine whether an optimized offload instruction has been received.

At block 916, the A/V processing instruction manager may determine whether an optimized offload instruction has been received from the trained neural network. For example, the neural network may output an optimized offload instruction for mitigating processor resource consumption by the MICA by spreading the consumption across a plurality of processors. The load on any single processor (e.g., CPU, GPU, VPU, GNA) of the information handling system executing the various modules of the multimedia framework pipeline and infrastructure platform during execution of the MICA in an embodiment may be decreased by directing the A/V processing instruction manager to engage alternate processors to execute various A/V processing instruction modules. For example, in an embodiment in which the virtual background module or boundary detection module are by default executed by the CPU, the A/V processing instruction manager may engage the GPU, VPU, or GNA (e.g., as identified within the optimized offload instruction) to execute one or both of these modules. As another example, in an embodiment in which the virtual background module or boundary detection module is by default executed by the GPU, the A/V processing instruction manager may engage the VPU, or GNA (e.g., as identified within the optimized offload instruction) to execute one or both of these modules.

Optimized offload instructions received at the A/V processing instruction manager in an embodiment may identify such an alternative processor, and associate this alternative processor with one or more of the virtual background module or boundary detection module identified within the optimized offload instructions. If an optimized offload instruction has not been received, the method may proceed to block 918 for execution of the virtual background module or boundary detection module via the CPU or other default processor (e.g., GPU). If an optimized offload instruction has been received, the method may proceed to block 920 for the A/V processing instruction manager to execute the virtual background module or boundary detection module by a processor other than the CPU or other default processor (e.g., GPU), as also identified within the received optimized offload instruction.

The A/V processing instruction manager may engage the video processing engine or audio processing engine to perform the virtual background module or boundary detection module using the CPU or other default processor at block 918 in an embodiment in which no offload instructions have been received. As described herein, the A/V processing instruction manager in an embodiment may, by default or in the absence of optimized offload instructions to the contrary, execute each of the queued A/V processing instruction modules via the CPU or another default processor (e.g., GPU). If the A/V processing instruction manager in an embodiment has not received such an optimized offload instruction, the CPU or other default processor may be used to execute the virtual background module or boundary detection module.

As described herein, the optimized boundary detection algorithm selection instruction incorporated within the optimized MMCA processor utilization instructions in an embodiment may adjust the algorithm used in the boundary detection module to an algorithm that requires lower computing overhead than the algorithm used in the default boundary detection module setting. The A/V processing instruction manager in an embodiment may execute the optimized boundary detection algorithm selection instruction, via the CPU, using such a specifically identified algorithm in such an embodiment. For example, the optimized boundary detection algorithm selection instruction may specifically identify an image matting algorithm, associated with a relatively higher CPU resource consumption rate, as described herein. As another example, the optimized boundary detection algorithm selection instruction may specifically identify an image segmentation algorithm, associated with a relatively lower CPU resource consumption rate, as described herein. By using the less complex algorithms identified within such an optimized boundary detection algorithm selection instruction in an embodiment, the processing power consumed during execution thereof may be decreased. This may result in a consequent improvement in performance of the information handling system executing such A/V processing instruction modules. In such way, the A/V processing instruction manager may decrease the processing load on the CPU or other default processor. The method may then proceed to block 922 to transmit to the multimedia multi-user collaboration application the processed, encoded media sample with the virtual background identified within the optimized virtual background selection instruction outside the boundary of the user detected based on the optimized boundary detection algorithm selection instruction.

At block 920, in an embodiment in which an optimized offload instruction identifying the virtual background module or the boundary detection module has been received, the A/V processing instruction manager may engage the video processing engine or audio processing engine to perform the virtual background module or the boundary detection module using the processor (e.g., other than the CPU) identified within the optimized offload instruction. For example, in an embodiment described with reference to FIG. 4, an optimized offload instruction may associate VPU 413 with an A/V processing instruction 443-1 for the boundary detection module. As another example, the optimized offload instruction may associate the GNA 414 with A/V processing instruction 443-1 for the boundary detection module. In yet another example, the optimized offload instructions may associate GPU 412 with A/V processing instruction 443-2 for the virtual background module.

The A/V processing instruction manager in an embodiment may transmit the processed, encoded media sample to the MICA at block 922. For example, in an embodiment described with reference to FIG. 6, the A/V processing instruction manager of the multimedia framework pipeline and infrastructure platform (e.g., 641) at the source information handling system (e.g., 601) may perform several A/V processing instruction modules on incoming audio and video samples, including encoding and multiplexing of these samples to form a processed, encoded media sample. This may also include application of the virtual background surrounding a detected boundary of the user in captured images, during execution of the virtual background module and the boundary detection module, as described herein. In such an embodiment, the processed, encoded media sample may be then be forwarded to the MMCA 651 for transmission (e.g., via a network) to the MMCA 652 at the sink information handling system 602.

At block 924, the MMCA in an embodiment may transmit the processed, encoded media sample to one or more remotely located information handling systems also participating in the same user session of the MMCA. For example, in an embodiment described with reference to FIG. 4, the processed and encoded media sample may be transmitted or streamed to the MMCA 450, where it will be streamed to a URI in the network 407 via the network interface device 409. In such a way, the intelligent contextual virtual background management system may direct processing tailored to a purpose of the videoconference user session of captured media samples shared amongst a plurality of information handling systems so as to optimize performance at one or more of these participating information handling systems. This may continue until the participant ends the videoconference session. The method of applying optimized instructions to optimize performance of the information handling system executing the application may then end.

The blocks of the flow diagrams of FIGS. 7, 8, and 9 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system executing an intelligent contextual virtual background management system, comprising:

a processor to execute code instructions of a multimedia multi-user collaboration application (MMCA) to join a videoconference session with a plurality of participants;

a controller to detect a current consumption of the processor resources by the multimedia multi-user collaboration application and an MMCA processor setting identifying one of a plurality of processors executing code instructions of the MMCA;

the processor to execute code instructions of the intelligent contextual virtual background management system to associate each of the plurality of participants with an organizational ranking relative to the user of the videoconference session determined from a labeled organizational ranking for invited participants, email of invited participants, or social media indications of organizational ranking for invited participants;

the processor to execute code instructions to input the organizational ranking of each of the plurality of participants relative to the user, the current consumption of the processor resources by the MMCA, and the MMCA processor setting MMCA to a trained neural network of the intelligent contextual virtual background management system and to output an optimized virtual background selection instruction to determine a corresponding virtual background based on the organizational ranking of at least one of the plurality of participants relative to the user and to output optimized MMCA processor utilization instructions predicted to adjust performance of the information handling system to meet a preset performance benchmark requirement, during the videoconference session; and the processor configured to process a video sample captured by the camera by applying a virtual background according to the optimized virtual background selection instruction and the optimized MMCA processor utilization instructions.

2. The information handling system of claim 1, wherein the organizational rankings indicate a purpose of the videoconference session, and the optimized virtual background selection instruction identifies a virtual background tailored for the purpose of the videoconference session for use with the streaming video of the user based on the organizational ranking of the plurality of participants relative to the user.

3. The information handling system of claim 1, wherein the preset performance benchmark requirement is a capped percentage of processor resource availability used by the MMCA during the videoconference session.

4. The information handling system of claim 1 further comprising:
a camera to capture a sample image of the user; and
the processor to determine a sample average brightness of the image of the user, wherein the average brightness of the image is input to the trained neural network, wherein a virtual background identified in the optimized virtual background selection instructions has a virtual background image average brightness that differs from the sample average brightness by a value within a preset tolerance to improve contrast of the user's image during the videoconference session.

5. The information handling system of claim 1 further comprising:
a global position satellite (GPS) sensor configured to detect a geographic location for the information handling system labeled by the user as private, wherein the geographic location labeled as private is input to the trained neural network; and
the processor to execute code instructions of the trained neural network configured to output the optimized virtual background selection instruction to initiate a virtual background based on the input geographic location labeled as private.

6. The information handling system of claim 1, further comprising:
the processor configured to apply the virtual background according to the optimized virtual background selection instruction using a graphics processing unit (GPU) according to the optimized MMCA processor utilization instructions output from the trained neural network.

7. The information handling system of claim 1, further comprising:
the optimized MMCA processor utilization instructions to direct application, by a graphics processing unit (GPU), of a virtual background tailored for a purpose of the videoconference session, as indicated in the organizational rankings.

8. An intelligent video processing management method, comprising:
joining a videoconference session with a plurality of participants via a processor executing code instructions of a multimedia multi-user collaboration application (MMCA);
detecting a current consumption of the processor resources by the multimedia multi-user collaboration application and an MMCA processor setting identifying one of a plurality of processors executing code instructions of the MMCA;
associating each of the plurality of participants with an organizational ranking relative to the user of the videoconference session determined from a labeled organizational ranking for invited participants, email of invited participants, or social media indications of organizational ranking for invited participants;
inputting the organizational ranking of each of the plurality of participants, the current consumption of the processor resources by the MMCA, and the MMCA processor setting to a trained neural network of the intelligent contextual virtual background management system, via the processor;
executing the trained neural network, via the processor, and outputting optimized MMCA processor utilization instructions predicted to adjust performance of the information handling system to meet a preset performance benchmark requirement, during the videoconference session based on detected organizational ranking of each of the plurality of participants relative to the user of the MMCA; and
processing a video sample captured by a camera by applying a virtual background around a boundary of the user detected according to the optimized MMCA processor utilization instructions.

9. The method of claim 8 wherein the processor is a central processing unit (CPU), and the preset performance benchmark requirement is a capped percentage of CPU availability used by the MMCA, during the videoconference session.

10. The method of claim 8, wherein the optimized MMCA processor utilization instructions identify use of an image matting algorithm.

11. The method of claim 8, wherein the optimized MMCA processor utilization instructions identify use of an image segmentation algorithm.

12. The method of claim 8 further comprising:
detecting the boundary of the user by executing a boundary detection algorithm identified in the optimized MMCA processor utilization instructions via a graphics processing unit (GPU) selected according to the optimized MMCA processor utilization instructions output from the trained neural network.

13. The method of claim 8 further comprising:
detecting the boundary of the user by executing a boundary detection algorithm identified in the optimized MMCA processor utilization instructions via a vision processing unit (VPU) according to the optimized MMCA processor utilization instructions output from the trained neural network.

14. The method of claim 8, wherein the organization rankings indicate a purpose of the videoconference session, further comprising:
executing the trained neural network, via the processor, and outputting an optimized virtual background selection instruction to select a virtual background tailored for the purpose of the videoconference session for use with the streaming video of the user based on the organizational ranking of the plurality of participants relative to the user.

15. An information handling system executing an intelligent contextual virtual background management system, comprising:
a first processor to execute code instructions of a multimedia multi-user collaboration application (MMCA) to join a videoconference session with a plurality of participants;
the first processor to determine a current consumption of processing resources of the first processor by the MMCA and an MMCA processor setting identifying one of a plurality of processors executing code instructions of the MMCA to apply a virtual background;
the first processor to execute code instructions of the intelligent contextual virtual background management system to associate each of the plurality of participants with organizational rankings relative to the user of the videoconference session indicating a purpose of the videoconference session;

the first processor to execute code instructions to input the organizational ranking of each of the plurality of participants and the current consumption of the first processor resources by the multimedia multi-user collaboration application to a trained neural network of the intelligent contextual virtual background management system and to output an optimized virtual background selection instruction to select a virtual background tailored for the purpose of the videoconference session for use with the streaming video of the user based on the organizational ranking of the plurality of participants relative to the user; and the first processor configured to process a video sample captured by a camera by applying a virtual background selected according to the optimized virtual background selection instruction around a boundary of the user.

16. The information handling system of claim 15, wherein the optimized virtual background selection instruction is adjusted to adjust performance of the information handling system to meet a preset performance benchmark requirement, during the videoconference session.

17. The information handling system of claim 15 further comprising:

the processor executing the trained neural network to output optimized MMCA processor utilization instructions identifying a second processor for executing a boundary detection algorithm, the optimized MMCA processor utilization instructions predicted to adjust performance of the information handling system to meet a preset performance benchmark requirement, during the videoconference session.

18. The information handling system of claim 15 further comprising:

the processor executing the trained neural network to output optimized MMCA processor utilization instructions predicted to adjust performance of the information handling system to meet a preset performance benchmark requirement, and directing a gaussian neural accelerator (GNA) to execute a boundary detection algorithm identified in the optimized MMCA processor utilization instructions.

19. The information handling system of claim 15 further comprising:

the processor executing the trained neural network to output optimized MMCA processor utilization instructions identifying use of an image matting algorithm predicted to adjust performance of the information handling system to meet a preset performance benchmark requirement, during the videoconference session.

20. The information handling system of claim 15 further comprising:

the processor executing the trained neural network to output optimized MMCA processor utilization instructions identifying use of an image segmentation algorithm predicted to adjust performance of the information handling system to meet a preset performance benchmark requirement, during the videoconference session.

* * * * *